United States Patent
Kato et al.

(10) Patent No.: US 7,937,027 B2
(45) Date of Patent: May 3, 2011

(54) DEVELOPING DEVICE AND IMAGE FORMING APPARATUS

(75) Inventors: Koichi Kato, Kanagawa (JP); Junichi Terai, Kanagawa (JP); Kiyonori Tsuda, Kanagawa (JP); Emi Kita, Tokyo (JP); Satoru Yoshida, Kanagawa (JP); Shinya Kikutani, Osaka (JP); Takashi Tanaka, Osaka (JP)

(73) Assignees: Ricoh Company Limited, Tokyo (JP); STARLITE Co., Ltd., Osaka-shi (JP)

( * ) Notice: Subject to any disclaimer, the term of this patent is extended or adjusted under 35 U.S.C. 154(b) by 208 days.

(21) Appl. No.: 12/235,135

(22) Filed: Sep. 22, 2008

(65) Prior Publication Data

US 2009/0080943 A1     Mar. 26, 2009

(30) Foreign Application Priority Data

Sep. 25, 2007 (JP) .................. 2007-247825

(51) Int. Cl.
*G03G 15/08* (2006.01)
(52) U.S. Cl. .......... 399/256; 399/121; 399/263
(58) Field of Classification Search .......... 399/121, 399/256, 258, 263
See application file for complete search history.

(56) References Cited

U.S. PATENT DOCUMENTS

| | | | |
|---|---|---|---|
| 6,214,277 B1 | 4/2001 | Saigo et al. | |
| 6,262,184 B1 | 7/2001 | Kanamori et al. | |
| 6,377,770 B1 | 4/2002 | Hirose et al. | |
| 7,062,207 B2 | 6/2006 | Tsuda et al. | |
| 7,072,602 B2 | 7/2006 | Hatori et al. | |
| 7,146,122 B2 | 12/2006 | Hatori et al. | |
| 7,184,691 B2 | 2/2007 | Kita et al. | |
| 7,218,879 B2 | 5/2007 | Enoki et al. | |
| 7,289,755 B2 | 10/2007 | Terai | |
| 7,315,711 B2 | 1/2008 | Ariizumi et al. | |
| 7,315,715 B2 | 1/2008 | Tsuda et al. | |
| 2004/0265721 A1 | 12/2004 | Matsuoka et al. | |
| 2005/0042534 A1* | 2/2005 | Tanaka et al. .............. | 430/108.4 |
| 2005/0088697 A1 | 4/2005 | Yasutomi et al. | |
| 2005/0254846 A1 | 11/2005 | Yura et al. | |
| 2006/0002743 A1 | 1/2006 | Katsuyama et al. | |
| 2006/0083555 A1 | 4/2006 | Uchiyama et al. | |
| 2007/0008135 A1 | 1/2007 | Tsuda et al. | |
| 2007/0059063 A1* | 3/2007 | Nakayama et al. ........... | 399/329 |
| 2007/0077098 A1 | 4/2007 | Katsuyama et al. | |
| 2007/0116494 A1 | 5/2007 | Uno et al. | |
| 2007/0122204 A1 | 5/2007 | Kita | |
| 2007/0140747 A1 | 6/2007 | Kita et al. | |
| 2007/0160392 A1 | 7/2007 | Tsuda et al. | |

(Continued)

FOREIGN PATENT DOCUMENTS

EP     0 254 307 A1     1/1988

(Continued)

*Primary Examiner* — David M Gray
*Assistant Examiner* — Barnabas T Fekete
(74) *Attorney, Agent, or Firm* — Oblon, Spivak, McClelland, Maier & Neustadt, L.L.P.

(57) ABSTRACT

A developing device includes a rotator that rotates around a shaft, and a bearing element that supports the shaft to a housing. A sliding element formed of a composite material that contains self-lubricating thermoplastic olefin resin as a base material is used as the bearing element. The sliding element formed of the composite material has at least a ratio of numerical values of "Rockwell hardness"/"bending elastic modulus" in a range from 25 to 45, and provides a sliding surface of which a frictional coefficient is lower than that of the sliding element formed of the base material.

15 Claims, 4 Drawing Sheets

U.S. PATENT DOCUMENTS

| | | |
|---|---|---|
| 2007/0166074 A1 | 7/2007 | Hosokawa et al. |
| 2007/0177905 A1 | 8/2007 | Hosokawa et al. |
| 2007/0212119 A1 | 9/2007 | Kurenuma et al. |
| 2007/0264052 A1 | 11/2007 | Yoshida et al. |
| 2007/0264054 A1 | 11/2007 | Tsuda et al. |
| 2008/0003021 A1 | 1/2008 | Hosokawa et al. |
| 2008/0025761 A1 | 1/2008 | Yoshida |
| 2008/0038021 A1 | 2/2008 | Tsuda et al. |
| 2008/0063433 A1 | 3/2008 | Miyamoto et al. |
| 2008/0085138 A1 | 4/2008 | Yoshida |
| 2008/0175628 A1 | 7/2008 | Kita et al. |
| 2008/0181630 A1 | 7/2008 | Matsumoto et al. |
| 2008/0181670 A1 | 7/2008 | Tsuda et al. |
| 2008/0187332 A1 | 8/2008 | Tsuda et al. |

FOREIGN PATENT DOCUMENTS

| | | |
|---|---|---|
| JP | 2000-250309 | 9/2000 |
| JP | 2001-125374 | 5/2001 |

* cited by examiner

US 7,937,027 B2

DEVELOPING DEVICE AND IMAGE FORMING APPARATUS

CROSS-REFERENCE TO RELATED APPLICATIONS

The present application claims priority to and incorporates by reference the entire contents of Japanese priority document 2007-247825 filed in Japan on Sep. 25, 2007.

BACKGROUND OF THE INVENTION

1. Field of the Invention

The present invention relates to an image forming apparatus and a developing device including a rotator and a bearing element that supports a rotating shaft of the rotator.

2. Description of the Related Art

Ball bearings and sliding bearings are used in image forming apparatuses at various locations. For example, ball bearings are used at a location in which a rotating shaft is supported. On the other hand, sliding bearings in which a rotating shaft rotates while sliding a sliding surface of the sliding bearing. Ball bearings are complicated in structure and therefore expensive than sliding bearings. Therefore, use of ball bearings is generally restricted to special situations i.e., where a comparatively large load exists. Bearing structures using the sliding bearing are described in FIGS. 8 and 9 (not shown) in Japanese Patent Application Laid-open No. 2001-125374.

The bearing structure of FIG. 8 includes sliding bearings provided at both ends of a rotator in the shaft direction, and this structure can reduce the cost as compared with the bearing structure using the ball bearing. The bearing structure of FIG. 9 includes a ball bearing provided at one end of a rotator in the shaft direction and a sliding bearing at the other end thereof. If drive is transferred to the rotating shaft from the outer sides of the bearings in the shaft direction of the rotator, a portion of the rotating shaft supported by the bearing on a drive input side is applied with a load larger than that of a portion thereof supported by the other bearing. In this case, as described in FIG. 9, by using the ball bearing for the bearing on the drive input side, durability of the bearing on the drive input side is improved more than that of the case in which the sliding bearings are used for both the two bearings, and this allows improvement of the durability of the entire bearing structure. Besides, cost reduction can be achieved as compared with the case in which the both bearings are provided with the ball bearings.

As described in FIGS. 8 and 9, by providing the sliding bearing for the both of the bearings or by providing the sliding bearing for one of the bearings depending on the intended use, the cost reduction of the bearing structure can be achieved without impairing durability of the bearing structure, as compared with the structure in which both of the bearings are provided with the ball bearings.

However, by continuously using a developing device that includes the bearing structure described in FIG. 8 or FIG. 9 over long periods, trouble such as abnormal noise has occurred from the bearing portion on the sliding bearing side.

The trouble due to its long-term use may occur not only in the bearing portion of the developing device, but also in any bearing portion that supports the rotating shaft of a rotator to a housing of the device.

The situation in which the abnormal noise has occurred indicates a situation in which frictional force between the rotating shaft and the bearing element increases to such an extent that the abnormal noise will occur. Therefore, if the situation is left as it is, the rotating shaft is locked to the bearings, which may lead to fatal damage of a drive source of the rotator or the like.

SUMMARY OF THE INVENTION

It is an object of the present invention to at least partially solve the problems in the conventional technology.

According to an aspect of the present invention, there is provided a developing device that supplies toner to and develops an electrostatic image formed on a latent-image carrier. The developing device includes a housing; a rotator that rotates around a rotating shaft; and a bearing element that supports the rotating shaft to the housing. A sliding element formed of a composite material is used as the bearing element, the composite material containing self-lubricating thermoplastic olefin resin as a base material, having at least a ratio of numerical values of Rockwell hardness (based on R scale of JIS K7202)/bending elastic modulus (based on JIS K7171) in a range from 25 to 45, and providing a sliding surface of which a frictional coefficient is lower than that of the base material.

According to another aspect of the present invention, there is provided an image forming apparatus that forms an image on a recording medium. The image forming apparatus includes a housing; a rotator that rotates around a rotating shaft; and a bearing element that supports the rotating shaft to the housing. A sliding element formed of a composite material that contains self-lubricating thermoplastic olefin resin as a base material is used as the bearing element, and the sliding element has at least a ratio of numerical values of Rockwell hardness (based on R scale of JIS K7202)/bending elastic modulus (based on JIS K7171) in a range from 25 to 45, and provides a sliding surface of which a frictional coefficient is lower than that of the sliding element formed of the base material.

According to still another aspect of the present invention, there is provided an image forming apparatus including a latent-image carrier; a latent-image forming unit that forms an electrostatic latent image on a surface of the latent-image carrier; and a developing device that supplies toner to and develops the electrostatic latent image into a toner image. The developing device includes a housing; a rotator that rotates around a rotating shaft; and a bearing element that supports the rotating shaft to the housing, wherein a sliding element formed of a composite material is used as the bearing element, the composite material containing self-lubricating thermoplastic olefin resin as a base material, having at least a ratio of numerical values of Rockwell hardness (based on R scale of JIS K7202)/bending elastic modulus (based on JIS K7171) in a range from 25 to 45, and providing a sliding surface of which a frictional coefficient is lower than that of the base material.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a view of the screw when viewed from the other side (back side) of FIG. 3, and FIG. 1B is a cross section of the screw and the bearing structure taken along the line A-A of FIG. 1A;

DETAILED DESCRIPTION OF THE PREFERRED EMBODIMENTS

Exemplary embodiments of the present invention will be explained in detail below with reference to the accompanying drawings. Hereinafter, one embodiment of a tandem-type color laser copier (hereinafter, "copier 500") is explained. The copier 500 is an image forming apparatus to which the present invention is applied and includes a plurality of photosensitive elements arranged in a tandem manner.

Figure 2:
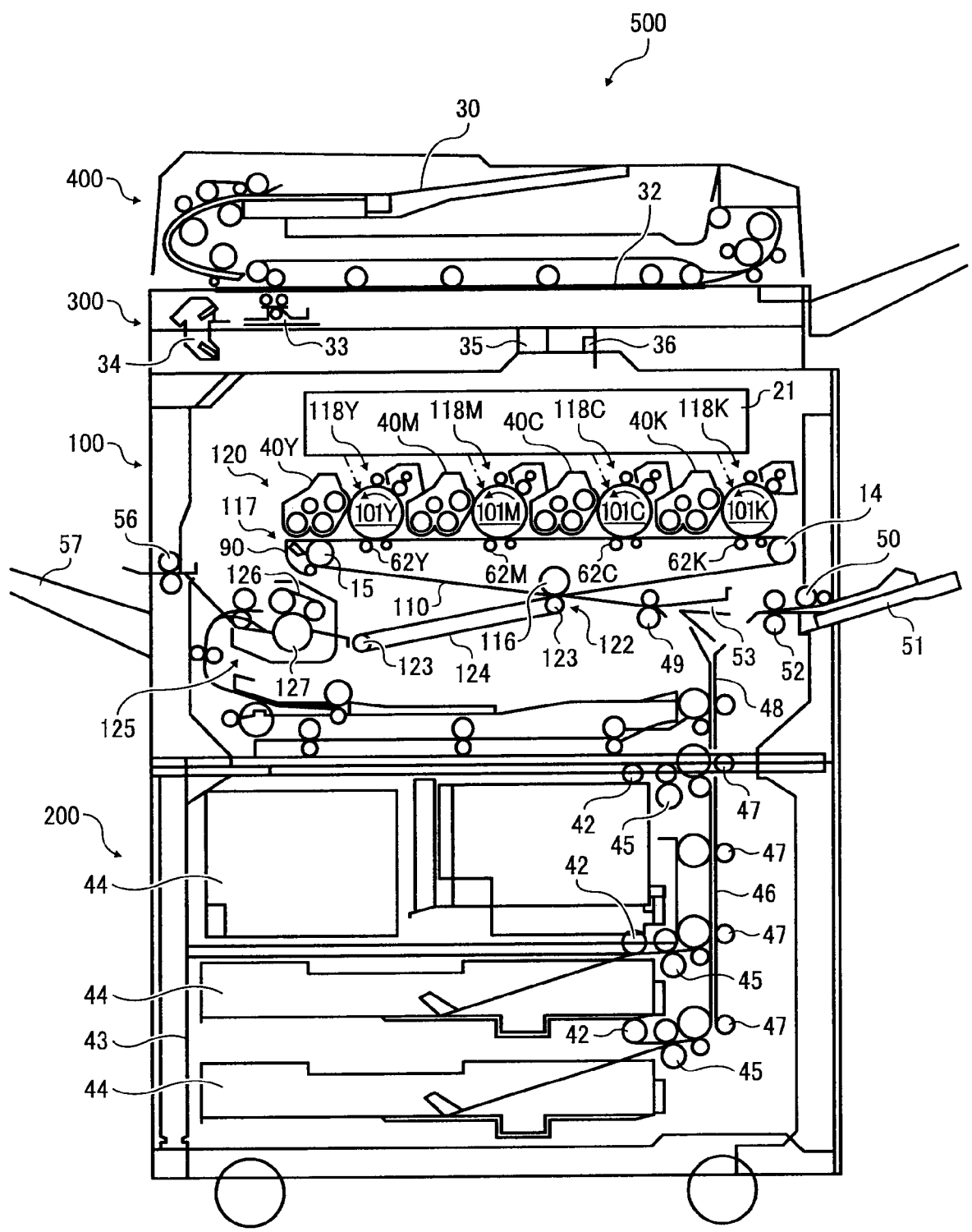
FIG. 2 is a schematic of a copier according to one embodiment of the present invention.

FIG. 2 is a schematic of the copier 500. The copier 500 includes a printer unit 100, a paper feed device 200 on which the printer unit 100 is set, and a scanner 300 fixedly set on the printer unit 100. The copier 500 also includes an automatic document feeder (ADF) 400 fixed on the scanner 300.

The printer unit 100 includes an imaging unit 120 that is formed of four process cartridges 118Y, 118M, 118C, and 118K to form images of colors of yellow (Y), magenta (M), cyan (C), and black (K). It is noted that the Y, M, C, and K added to reference numerals indicate units for yellow, magenta, cyan, and black, respectively (hereinafter the same). In addition to the process cartridges 118Y, 118M, 118C, and 118K, the printer unit 100 further includes an optical writing unit 21, an intermediate transfer unit 117, a secondary transfer device 122, a registration roller pair 49, and a fixing device 125 of a belt fixing system.

The optical writing unit 21 includes a light source, a polygon mirror, an f0 lens, and a reflective mirror, which are not shown, and the surface of a photosensitive element explained later is irradiated with a laser beam based on image data.

Each of the process cartridges 118Y, 118M, 118C, and 118K includes a drum-type photosensitive element 101 (Y, M, C, or K) being a latent-image carrier, a charger, a developing device 40 (Y, M, C, or K), a drum cleaning device, and a decharger.

A process cartridge 118 for yellow (118Y) will be explained below.

The charger being a charging unit uniformly charges the surface of the photosensitive element 101Y. The surface of the photosensitive element 101Y subjected to the charging process is irradiated with a laser beam modulated and deflected by the optical writing unit 21. This causes potential on the surface of the photosensitive element 101Y corresponding to an irradiating unit (exposing unit) to decrease. The decrease in the surface potential allows formation of an electrostatic latent image for Y on the surface of the photosensitive element 101Y. The formed electrostatic latent image for Y is developed by the developing device 40Y being a developing unit, and a Y toner image is formed.

The Y toner image formed on the photosensitive element 101Y is primarily transferred to an intermediate transfer belt 110 explained later. After the toner image is primarily transferred, residual toner remains on the surface of the photosensitive element 101Y, and a drum cleaning device cleans the residual toner.

In the process cartridge 118Y, the photosensitive element 101Y cleaned by the drum cleaning device is decharged by the decharger, is uniformly charged by the charger, and is returned to an initial state. The series of processes as explained above are the same as those in the other process cartridges 118M, 118C, and 118K.

The intermediate transfer unit will be explained below.

The intermediate transfer unit 117 includes the intermediate transfer belt 110 and a belt cleaning device 90, and further includes a stretching roller 14, a driving roller 15, a secondary-transfer backup roller 116, and four primary-transfer bias rollers 62Y, 62M, 62C, and 62K.

The intermediate transfer belt 110 is stretched by a plurality of rollers including the stretching roller 14 so as to keep the tension thereof. The intermediate transfer belt 110 is caused to endlessly move in the clockwise of FIG. 2 following the rotation of the driving roller 15 driven by a belt driving motor (not shown).

The four primary-transfer bias rollers 62Y, 62M, 62C, and 62K are arranged so as to contact an inner peripheral surface of the intermediate transfer belt 110, and are applied with primary transfer bias from a power supply (not shown). Further, the four primary-transfer bias rollers 62Y, 62M, 62C, and 62K press the intermediate transfer belt 110 from the inner peripheral surface against the photosensitive elements 101Y, 101M, 101C, and 101K respectively, to form primary transfer nips respectively. In each of the primary transfer nips, a primary-transfer electric field is formed between the photosensitive element 101 and the primary-transfer bias roller 62, due to the primary transfer bias.

The Y toner image formed on the photosensitive element 101Y is primarily transferred to the intermediate transfer belt 110 by the primary-transfer electric field and nip pressure. Primarily transferred to the Y toner image are M, C, and K toner images formed on the photosensitive elements 101M, 101C, and 101K so as to be sequentially superimposed on the Y toner image. The primary transfer in the superimposition manner allows formation of four-color superimposed toner images (hereinafter, "four-color toner images") being multiple toner images on the intermediate transfer belt 110.

The four-color toner images on the intermediate transfer belt 110 are secondarily transferred to a transfer paper being a recording medium (not shown) at a secondary transfer nip explained later. The residual toner remaining on the surface of the intermediate transfer belt 110 after transfer of the toner image and after the intermediate transfer belt 110 passes through the secondary transfer nip is cleaned by the belt cleaning device 90 that holds the belt with the driving roller 15 shown in the left side of FIG. 2.

The secondary transfer device 122 will be explained below.

The secondary transfer device 122 that stretches a paper conveyor belt 124 with two stretching rollers 123 is arranged in the lower side of the intermediate transfer unit 117 in FIG. 2. The paper conveyor belt 124 is caused to endlessly move in the counterclockwise in FIG. 2 following rotation of at least either one of the stretching rollers 123. The intermediate transfer belt 110 and the paper conveyor belt 124 are held between one of the two stretching rollers 123 provided in the right side of FIG. 2 and the secondary-transfer backup roller 116 of the intermediate transfer unit 117. Consequently, the secondary transfer nip is formed at a contact portion between the intermediate transfer belt 110 of the intermediate transfer unit 117 and the paper conveyor belt 124 of the secondary transfer device 122. The one of the two stretching rollers 123 is applied with a secondary transfer bias having an opposite polarity to that of toner from the power supply (not shown).

By applying the secondary transfer bias thereto, a secondary-transfer electric field is formed at the secondary transfer nip. The secondary-transfer electric field causes the four-color toner images on the intermediate transfer belt 110 to be electrostatically moved from the belt to the one of the stretching rollers 123. A transfer paper is fed to the secondary transfer nip by the registration roller pair 49, which is explained later, so as to be synchronized with the four-color toner images on the intermediate transfer belt 110, and the four-color toner images affected by the secondary-transfer electric field and the nip pressure are secondarily transferred to the transfer paper. It is noted that a charger that charges the transfer paper in a noncontact manner may be provided instead of a secondary transfer system of applying the secondary transfer bias to the one of the stretching rollers 123.

The paper feed device 200 provided in the lower part of the body of the copier 500 includes a plurality of paper feed cassettes 44 which are vertically arranged therein and each of which can store a plurality of sheets of transfer paper. Each of the paper feed cassettes 44 is structured to push a paper feed roller 42 against the topmost transfer paper of the sheets. The topmost transfer paper is fed to a paper feed path 46 by rotation of the paper feed roller 42.

The paper feed path 46 receiving the transfer paper sent from the paper feed cassette 44 includes a plurality of conveying roller pairs 47 and the registration roller pair 49 that is provided near the end of the paper feed path 46. The transfer paper is conveyed toward the registration roller pair 49. The transfer paper having reached the registration roller pair 49 is held between rollers of the registration roller pair 49. Meanwhile, in the intermediate transfer unit 117, the four-color toner images formed on the intermediate transfer belt 110 enter the secondary transfer nip according to the endless movement of the belt. The registration roller pair 49 sends the transfer paper held between the rollers to the secondary transfer nip at a timing when the transfer paper can be brought into contact with the four-color toner images at the secondary transfer nip. Consequently, the four-color toner images on the intermediate transfer belt 110 come in tight contact with the transfer paper. Then, the four-color toner images are transferred to the transfer paper to be formed as a full color image thereon. The transfer paper with the full color image formed thereon in the above manner is output from the secondary transfer nip due to the endless movement of the paper conveyor belt 124, and is sent from the paper conveyor belt 124 to the fixing device 125.

The fixing device 125 includes a belt unit that causes a fixing belt 126 stretched by two rollers to endlessly move, and a pressing roller 127 that is pressed against one of the rollers. The fixing belt 126 and the pressing roller 127 are in contact with each other to form a fixing nip, and the transfer paper received from the paper conveyor belt 124 is held at the fixing nip. One of the two rollers in the belt unit pressed by the pressing roller 127 has a heat source (not shown) inside thereof, and the fixing belt 126 is heated by heat generated therein. The heated fixing belt 126 heats the transfer paper held at the fixing nip. The full color image is fixed on the transfer paper due to the heating and the nip pressure.

The transfer paper subjected to the fixing process in the fixing device 125 is stacked on a stack portion 57, which is provided outside of a plate on the left-hand side of FIG. 2 in a housing of a printer, or is returned to the secondary transfer nip to form a toner image on the other surface of the transfer paper.

When originals (not shown) are to be copied, for example, a bundle of sheet originals is set on a document tray 30 of the ADF 400. However, if the originals are bound in a book form, then the bounded originals are set on an exposure glass 32. Before setting the originals thereon, the ADF 400 is opened with respect to the body of the copier so that the exposure glass 32 of the scanner 300 is exposed. Thereafter, the bounded originals are set thereon and the ADF 400 is closed toward them so that the bounded originals are pressed by the closed ADF 400.

A copy start switch (not shown) is pressed after the originals are set in the above manner, and the scanner 300 starts an original reading operation. However, if a sheet original is set on the ADF 400, the ADF 400 automatically moves the sheet original up to the exposure glass 32 before the original reading operation is started. In the original reading operation, first, both a first carrier 33 and a second carrier 34 start to move, and light is emitted from a light source provided in the first carrier 33. Then, reflected light from the surface of the original is reflected by a mirror provided in the second carrier 34, passes through an imaging lens 35, and then enters a reading sensor 36. The reading sensor 36 forms image information based on the incident light.

In parallel with the original reading operation, units in each of the process cartridges 118Y, 118M, 118C, and 118K, the intermediate transfer unit 117, the secondary transfer device 122, and the fixing device 125 start to drive. The optical writing unit 21 is driven based on image formation made by the reading sensor 36, and Y, M, C, and K toner images are thereby formed on the photosensitive elements 101Y, 101M, 101C, and 101K, respectively. These toner images are transferred in a superimposing manner to the intermediate transfer belt 110, to form four-color toner images.

A paper feeding operation is started in the paper feed device 200 almost simultaneously with the start of the original reading operation. In the paper feeding operation, one of the paper feed rollers 42 is selectively rotated, and sheets of transfer paper are sequentially fed out from one of the paper feed cassettes 44 which are stored in multiple stages provided in a paper bank 43. The fed-out sheets are separated one by one by a separation roller 45, and the sheet enters the paper feed path 46 and is conveyed toward the secondary transfer nip by the conveying roller pair 47. A sheet can also be manually fed from a manual feed tray 51 instead of paper feeding from the paper feed cassette 44. In this case, a manual paper feed roller 50 is selectively rotated to sequentially feed out sheets of transfer paper on the manual feed tray 51, and then a separation roller 52 separates the sheets one by one to feed the sheet to a manual paper feed path 53 of the printer unit 100.

When the copier 500 forms a multicolor image with toner of two or more colors, the intermediate transfer belt 110 is stretched so that an upper-side stretched surface thereof is kept to an almost horizontal position, and all the photosensitive elements 101Y, 101M, 101C, and 101K are brought into contact with the upper-side stretched surface. Meanwhile, when the copier 500 forms a monochrome image with only K toner, the intermediate transfer belt 110 is inclined toward the lower left in FIG. 2 by a mechanism (not shown), and the upper-side stretched surface is separated from the photosensitive elements 101Y, 101M, and 101C. Only the photosensitive element 101K of the four photosensitive elements 101Y, 101M, 101C, and 101K is made to rotate in the counterclockwise in FIG. 2, to form only the K toner image. At this time, not only the photosensitive elements 101 (Y, M, and C) but also the developing devices 40 (Y, M, and C) are stopped, so that unnecessary wear of the components in the photosensitive elements 101 and the developing device 40 and unnecessary consumption of the developers in the developing devices 40 are prevented.

The copier 500 includes a control unit (not shown) formed of components such as a central processing unit (CPU) that controls devices in the copier 500, and an operation display unit (not shown) formed of a liquid crystal display and various types of keys. An operator operates key entry to the operation display unit so as to send an instruction to the control unit, and can thereby select one mode from among three modes related to one-side print mode to form an image on one side of transfer paper. The three one-side print modes contain a direct discharge mode, a reverse discharge mode, and a reverse decal discharge mode.

Figure 3:
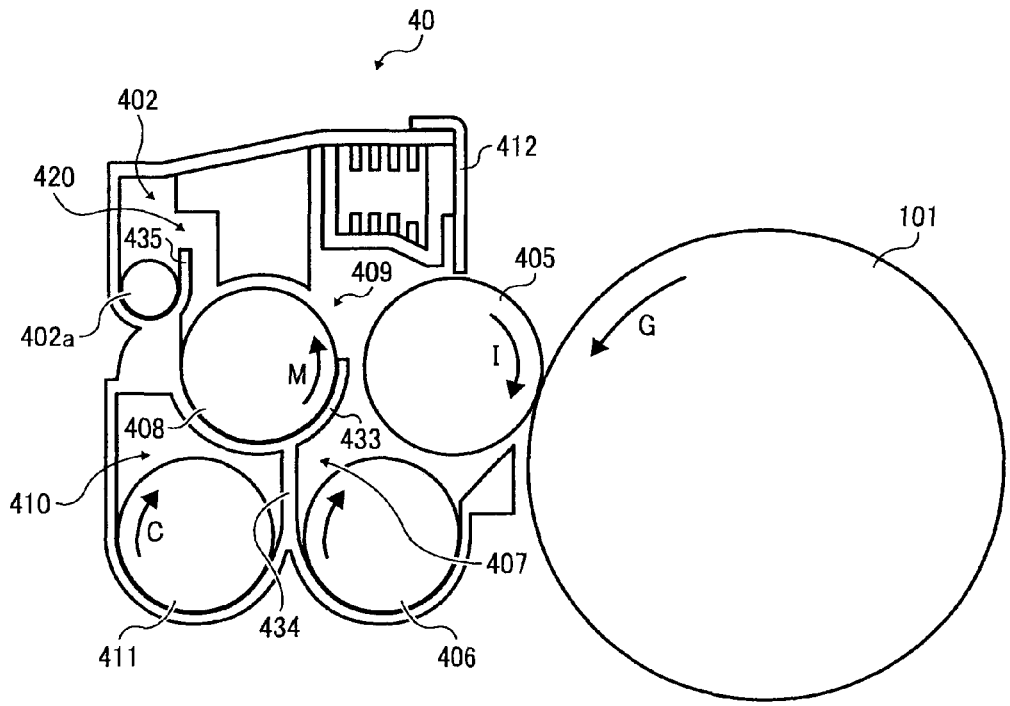
FIG. 3 is a schematic of a developing device and a photosensitive element.

FIG. 3 is an enlarged schematic of the developing device 40 and the photosensitive element 101 that are provided in one of the four process cartridges 118Y, 118M, 118C, and 118K. The four process cartridges 118Y, 118M, 118C, and 118K have an almost similar configuration to one another except for colors of toner handled thereby, and thus, the additional characters Y, M, C, and K to be added to "40" are omitted.

The surface of the photosensitive element 101 is charged by a charging device (not shown) while rotating in the direction of arrow G as shown in FIG. 3. The surface of the charged photosensitive element 101 is irradiated with a laser beam from an exposing device (not shown) to form an electrostatic latent image, and then toner is supplied to the latent image from the developing device 40, to form a toner image.

The developing device 40 includes a developing roller 405 being a developer carrier that supplies toner to the latent image on the surface of the photosensitive element 101 while the surface of the developing roller 405 moves in the direction of arrow I of FIG. 3 and develops the latent image. The developing roller 405 has a rotatable developing sleeve, and a magnetic body (not shown) formed of a plurality of magnetic poles is provided inside the developing sleeve. The magnetic body is necessary to hold a developer on the surface of the developing roller 405.

The developing device 40 also includes a supplying screw 408 being a supplying-conveying element that conveys the developer to this side of FIG. 3, or to this side perpendicularly to the paper surface of FIG. 3, along the axial direction of the developing roller 405 while supplying the developer to the developing roller 405.

A doctor blade 412 is provided on the downstream side in the surface-moving direction of the developing roller 405 from the opposed portion to the supplying screw 408. The doctor blade 412 is a developer control unit that controls the developer supplied to the developing roller 405 into a thickness appropriate for developing.

A collecting-conveying path 407 for developer faces the developing roller 405 on the downstream side in the surface-moving direction from a developing area which is an opposed portion of the developing roller 405 to the photosensitive element 101. Specifically, the collecting-conveying path 407 is used to collect developer that has been used for developing and has been separated from the surface of the developing roller 405 by passing through the developing area. The collecting-conveying path 407 includes a collecting screw 406 being a collecting-conveying element that is provided in parallel with the axial direction of the developing roller 405. The collecting-conveying element collects the developer and coveys the collected developer in the same direction as the supplying screw 408 along the axial direction of the developing roller 405. A supplying-conveying path 409 for developer including the supplying screw 408 is disposed in the horizontal direction while the collecting-conveying path 407 including the collecting screw 406 is disposed in parallel with the supplying-conveying path 409 below the developing roller 405.

The developer can be separated from the developing roller 405 by setting the magnetic body inside the developing sleeve to a state so that no magnetic pole is disposed only in a location from which the developer is wished to be separated. Further, a magnetic body may be used in such a manner that magnetic poles are arranged so that a repelling magnetic field is formed in a location from which the developer is wished to be separated.

The developing device 40 includes a stirring-conveying path 410 for developer provided in parallel with the collecting-conveying path 407 below the supplying-conveying path 409. The stirring-conveying path 410 includes a stirring screw 411 being a stirring-conveying element that is provided in parallel with the axial direction of the developing roller 405. The stirring screw 411 conveys the developer to the other side of FIG. 3, or to the other side perpendicularly to the paper surface of FIG. 3, that is the opposite direction to the supplying screw 408 while stirring the developer along the axial direction of the developing roller 405.

The supplying-conveying path 409 and the stirring-conveying path 410 are partitioned by a first partition wall 433. The first partition wall 433 that partitions the supplying-conveying path 409 and the stirring-conveying path 410 has openings at both ends thereof on this side and the other side of FIG. 3, through which the supplying-conveying path 409 and the stirring-conveying path 410 communicate each other.

The supplying-conveying path 409 and the collecting-conveying path 407 are also partitioned by the first partition wall 433, however, no opening is provided in the portion of the first partition wall 433 that partitions the two paths.

The two developer conveying paths of the stirring-conveying path 410 and the collecting-conveying path 407 are partitioned by a second partition wall 434 being a partition element. The second partition wall 434 has an opening on this side of FIG. 3, through which the stirring-conveying path 410 and the collecting-conveying path 407 communicate each other.

The supplying screw 408, the collecting screw 406, and the stirring screw 411 which are developer conveying screws are SUS-made screws, in which all of the screws has a screw diameter of 22 millimeters, the supplying screw 408 is double flighted and a screw pitch thereof is 50 millimeters, and the supplying screw 408 is made to rotate in the arrow M direction of FIG. 3, the collecting screw 406 and the stirring screw 411 are single flighted and a screw pitch thereof is 25 millimeters, and the collecting screw 406 and the stirring screw 411 are made to rotate in the arrow C direction of FIG. 3, and the number of revolutions per minute of all the screws is set to about 600 rpm.

It is noted that the screw is not limited to the SUS made, and therefore a metal screw or a resin screw may be used.

The developer is made thin on the developing roller 405 by the doctor blade 412 made of stainless steel, and is conveyed to the developing area that faces the photosensitive element 101 and development is performed. The surface of the developing roller 405 is provided with V-grooves or sand-blast processed, and is formed of an aluminum or a SUS tube with a diameter of 25 millimeters, and a gap between the doctor blade 412 and the photosensitive element 101 is about 0.3 millimeter.

The developer is collected through the collecting-conveying path 407 after development, conveyed to this side of the cross section in FIG. 3, and transferred to the stirring-conveying path 410 at the opening of the first partition wall 433 provided in a non-image area. The toner is supplied into the stirring-conveying path 410 through a toner supply port that is provided at an upper side of the stirring-conveying path 410 near the opening of the first partition wall 433 on the upstream side in the developer conveying direction of the stirring-conveying path 410.

Circulation of the developer within the three developer conveying paths will be explained below.

The supplying-conveying path 409, which receives the developer from the stirring-conveying path 410, conveys the developer toward the downstream of the conveying direction of the supplying screw 408 while supplying the developer to the developing roller 405. Then surplus developer, which is supplied to the developing roller 405 and conveyed to the downstream end of the supplying-conveying path 409 in the conveying direction without being used for development, is supplied to the stirring-conveying path 410 through the opening of the first partition wall 433 at the end on this side of FIG. 3.

Meanwhile, the developer supplied to the developing roller 405 is used for development in the developing area, and is then separated or detached from the developing roller 405, to be transferred to the collecting-conveying path 407. The collected developer transferred from the developing roller 405 to the collecting-conveying path 407 is conveyed to the downstream end in the conveying direction of the collecting-conveying path 407 by the collecting screw 406, and is supplied to the stirring-conveying path 410 through the opening of the second partition wall 434.

Then the stirring-conveying path 410 stirs the supplied surplus developer and the collected developer, and conveys the stirred developer to the downstream side in the conveying direction of the stirring screw 411 which is the upstream side in the conveying direction of the supplying screw 408, and the developer is supplied to the supplying-conveying path 409 through the opening at the end of the first partition wall 433 on the other side of FIG. 3.

In the stirring-conveying path 410, the collected developer, the surplus developer, and toner supplied as required in a transfer portion are stirred and conveyed by the stirring screw 411 in the direction reverse to that of the developers within the collecting-conveying path 407 and the supplying-conveying path 409. Then, the stirred developer is transferred to the upstream side in the conveying direction of the supplying-conveying path 409 that communicates with the collecting-conveying path 407 through a supply opening on the downstream side in the conveying direction. A toner concentration sensor (not shown) formed of a permeability sensor is provided below the stirring-conveying path 410, and a toner-supply control device (not shown) is operated by a sensor output and then the toner is supplied from a toner container (not shown).

The developing device 40 shown in FIG. 3 is configured to include the supplying-conveying path 409 and the collecting-conveying path 407, and to supply and collect the developer using the different developer conveying paths, and thus, the developer after developing is prevented from entering the supplying-conveying path 409. Therefore, it is possible to prevent more decrease of toner concentration in the developer that is supplied to the developing roller 405 in a portion nearer to the downstream end in the conveying direction of the supplying-conveying path 409. In addition, the developing device 40 shown in FIG. 3 is further configured to include the collecting-conveying path 407 and the stirring-conveying path 410, and to collect and stir the developer using the different developer conveying paths, and thus, the developer after developing is prevented from dropping in the middle of stirring the developers. Consequently, the sufficiently stirred developer can be supplied to the supplying-conveying path 409, and thus, the developer to be supplied to the supplying-conveying path 409 can be prevented from being insufficiently stirred. Accordingly, the decrease of toner concentration in the developer within the supplying-conveying path 409 can be prevented and insufficient stirring of the developers within the supplying-conveying path 409 can be prevented. As a result, image density can be made constant during developing.

The developing device 40 further includes a developer discharge port 420 in the supplying-conveying path 409, the developer discharge port 420 being a developer discharging unit through which the developer having passed is discharged to the outside of the developing device 40. The developer having passed through the developer discharge port 420 is transferred as discharged developer to a discharging-conveying path 402 for developer, and is conveyed in the reverse direction (direction toward the other side of FIG. 3) to the conveying direction (direction toward this side of FIG. 3) of the supplying-conveying path 409 by rotation of a discharging screw 402a.

The discharging-conveying path 402 is arranged so as to be adjacent to the supplying-conveying path 409 through a discharge partition wall 435 on the downstream side in the conveying direction of the supplying-conveying path 409, and the developer discharge port 420 is an opening provided on the discharge partition wall 435 so that the supplying-conveying path 409 and the discharging-conveying path 402 communicate each other therethrough.

A bearing structure of a screw that is applicable to at least one of the three screws provided in the developing device 40 such as the supplying screw 408, the collecting screw 406, and the stirring screw 411 will be explained below. It is noted that a screw 220 to be explained with reference to FIGS. 1A and 1B is applied to all the three screws in the developing device 40.

Figure 1A:
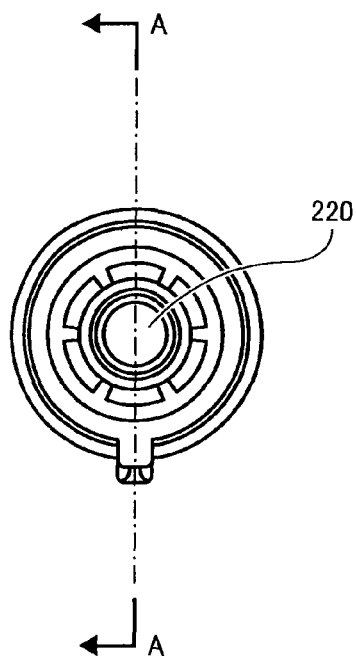
FIGS. 1A and 1B are schematics for explaining a bearing structure of a screw.
Figure 1B:
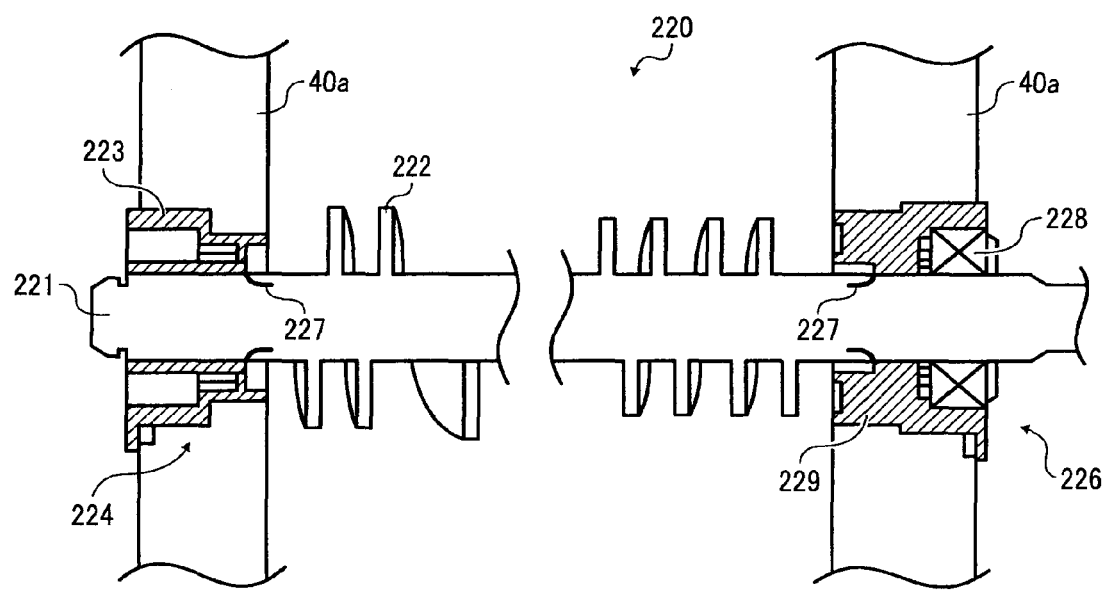

FIGS. 1A and 1B are schematics for explaining a bearing structure of the screw.

FIG. 1A is a view of the screw 220 when viewed from the other side of FIG. 3, and FIG. 1B is a cross section of the screw 220 and the bearing structure taken along the line A-A of FIG. 1A.

The screw 220 being a rotator is formed by fixing a spiral blade portion 222 to a shaft portion 221 which is a rotating shaft, and both ends of the screw 220 are supported by bearings to a housing 40a of the developing device 40. The developing device 40 includes a drive transmission unit (not shown) on the right side of FIG. 1B, the drive transmission unit transmitting drive from a drive source (not shown) to the screw 220.

The bearing structure shown in FIG. 1B includes a drive-side bearing 226 that supports the shaft portion 221 to the housing 40a of the drive transmission unit side (not shown) and a driven-side bearing 224 that supports the shaft portion 221 to the housing 40a on the opposite side of the drive transmission side.

The drive-side bearing 226 includes a ball bearing 228, a bearing case 229 being a holder that holds the ball bearing 228, and a rubber seal 227.

The rubber seal 227 is a seal ring that is an elastic body made of fluororubber and is molded in a ring shape, and seals the shaft portion 221 by being tightened in a radial direction with ripples formed in the inner peripheral portion of the rubber seal 227.

The bearing case 229 is a molded piece made of polyacetal resin or the like being a crystalline resin, which is formed by integrally molding a fluororubber seal 227 for a shaft with a diameter of, for example, 8 millimeters, and press-fitting the ball bearing 228 for the shaft with a diameter of 8 millimeters from the right side of FIG. 1B.

Meanwhile, the driven-side bearing 224 located in the opposite side of the drive-side bearing 226 through the blade portion 222 has no ball bearing but has a sliding bearing, unlike the drive-side bearing 226. The driven-side bearing 224 is formed by integrally molding a bearing element 223, of which inner peripheral surface is slid by the shaft portion 221, and the rubber seal 227 made of fluororubber for the shaft with a diameter of 8 millimeters. In addition, a bearing element having the characteristics of the present invention is used as the bearing element 223.

A resin-based sliding element (hereinafter, sometimes described as "sliding element") used for the bearing element 223 is formed of a composite material that contains self-lubricating thermoplastic olefin resin as a base material (which occupies most of the composite material).

In the sliding element (composite material), a ratio of a numerical value of Rockwell hardness (based on R scale of JIS K7202) to a numerical value of a bending elastic modulus [GPa] (based on JIS K7171), or {(Rockwell hardness)/(bending elastic modulus)} is set to a range of 25 to 45. Besides, the sliding element provides a sliding surface of which a frictional coefficient decreases more than that of the sliding element made of only the base material. Thus, effects according to the present invention can be obtained.

It is confirmed based on Experiment 1 explained later that following sliding performances of the sliding element used for the bearing element 223 can be determined or specified based on a comparison between numerical ranges of the performances and a frictional coefficient with the base material. Specifically, the sliding performances include long-lasting lubricity of a sliding surface (particularly, a sliding surface along which the element is caused to slide with oil lubrication), and elimination or reduction in attacking property against an opposing element, and also include accuracy, stability, and safety or the like during long-time sliding.

The ratio of the Rockwell hardness to the bending elastic modulus represented by (Rockwell hardness)/(bending elastic modulus) is simply obtained by dividing a numerical value of the Rockwell hardness (based on R scale of JIS K7202) by a numerical value of a bending elastic modulus [GPa] (based on R scale of JIS K7171) (hereinafter, sometimes described as "(rigidity)/(elastic modulus)". For example, in Example 1 of Table 1, the Rockwell hardness (based on R scale of JIS K7202) is 58 and the bending elastic modulus [GPa] (based on JIS K7171) is 1.6 giga Pascal, and thus, a value of (rigidity)/(elastic modulus) is simply determined as 58/1.6=36.

In Experiment 1 explained later, Examples 1 to 2 and Comparative Examples 1 to 2 use test pieces which are a composite material made of the same base material (high-density polyethylene) and have slight difference from each other in mechanical properties (represented by hardness and bending elastic modulus), frictional performance, and wear performance. Comparative Example 4 uses a test piece formed of only the base material used in Examples 1 to 2 and Comparative Examples 1 to 2, and Comparative Example 3 uses a test piece formed of a composite material made of a different base material (polyacetal resin) from that of the other test pieces. Experiment 1 shows parts of representative examples in experiments carried out to examine a correlation between the properties of the test pieces and effects such as reduction in attacking property against the opposing element or minimization of wear over time.

As a result of Experiment 1, based on conditions in which the frictional coefficient is lower than that of the base material (particularly, lower by 10% or more) in a range of the value of (rigidity)/(elastic modulus) being 25 to 45, it is found that a resin-based sliding element can be obtained, the resin-based sliding element allowing a sliding surface (particularly, a sliding surface along which the element is caused to slide with oil lubrication) that has effects such as the reduction in attacking property against the opposing element and the minimization of wear over time.

If the value of (rigidity)/(elastic modulus) is smaller than 25, the strength of a compact and precise sliding unit or sliding device is insufficient. If the value of (rigidity)/(elastic modulus) is greater than 45, the attacking property against the opposing element upon sliding increases. The lower limit of the frictional coefficient of the resin-based sliding element is about 30% of the frictional coefficient of the sliding element made only of, for example, the base material. Because, to further reduce the frictional coefficient, disadvantages increase such that it is necessary to add the amount of inorganic solid lubricant based on which the attacking property against the opposing element is generated.

The "frictional coefficient" of the present specification indicates a motion frictional coefficient or a coefficient of dynamic friction that represents motion resistance appearing on the contact surface when an object comes in contact with other object and moves. The coefficient of dynamic friction is represented by a numerical value indicated by Mu ($\mu$).

A device of measuring the coefficient of dynamic friction has a same basic configuration as that of a general measurement device (see ASTM F609-96), and is configured to cause a test piece of a sliding element to be measured to come in contact with an opposing material under a fixed load, move either one of these (most of them is rotational movement), transmit frictional resistance produced at that time to a controller, and display the frictional resistance.

Figure 4:
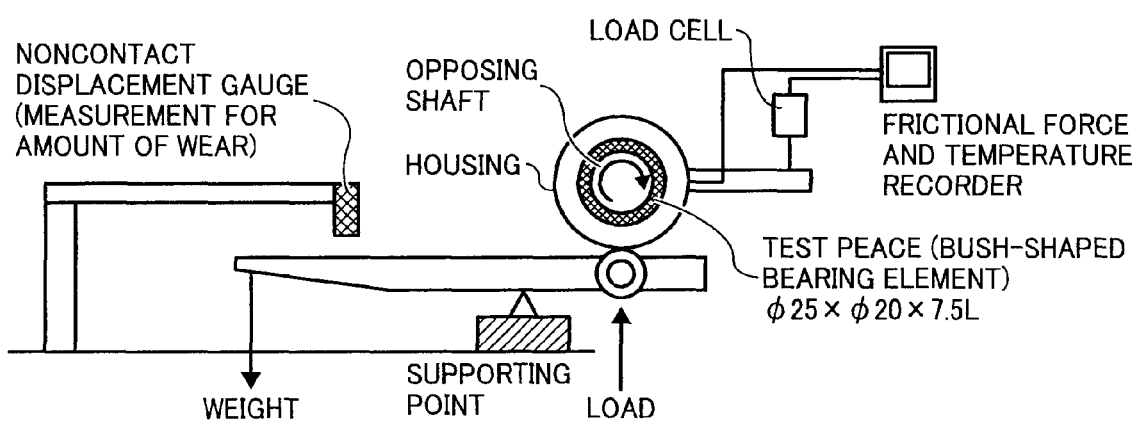
FIG. 4 is a schematic of a device used to measure coefficients of dynamic friction in Examples and Comparative Examples in Experiment 1.

FIG. 4 is a schematic of a device that measured coefficients of dynamic friction of Examples and Comparative Examples in Experiment 1. The basic configuration of the device is the same as that of the general measurement device. In FIG. 4, a sliding element to be measured is a bush-shaped test piece, and one end of the test piece is made in contact with a disk as an opposing material (not shown) with a fixed load, the disk being fixed to a housing, and the test piece is made in contact with the disk under the fixed load by rotation of the housing.

The frictional resistance produced at that time is recorded by a recorder through a load cell.

If a requirement for a frictional coefficient of the resin-based sliding element according to the present invention is represented as a coefficient of dynamic friction, $\mu$=0.20 or less.

A material and a manufacturing method of the sliding element used in the bearing element 223 will be explained below.

Self-Lubricating Thermoplastic Olefin Resin:

A material forming a sliding unit or sliding device that is compact but has a complicated form can be resin (resin with high density being not less than medium density and with a large molecular weight) that gives corresponding mechanical strength to the unit or the device and needs to have melt flow rate (based on JIS K7210) so as to enable injection molding. Besides, the thermoplastic olefin resin occupies 75 percent by volume of the sliding element (preferably 90% by volume or more), and thus, the thermoplastic olefin resin itself needs to have self-lubricating property.

As the self-lubricating thermoplastic olefin resin, for example, a polyethylene group having melt flow rate so as to enable injection molding (e.g., medium-density polyethylene, high-density polyethylene, and ultrahigh molecular weight polyethylene) and a polypropylene group are suitable.

These groups can be used alone, or as a mixture thereof, a copolymer, and a modified matter.

High-density resin is suitable because it has self-lubricating property. As for the polyethylene group, because polyethylenes industrially produced and sold are separated as low-density, medium-density, and high-density ones, it is suitable for general-purpose products to use the high-density polyethylene with high mechanical strength and excellent in molding processability.

If the melt flow rate (which may be explained as molding capability or molding processability) of the high-density polyethylene is in a range of about (2 to 50 grams)/(10 minutes), the high-density polyethylene is suitable for injection molding into the sliding unit with a complicated form such as a gear, bearing, and mechanism components. While if the melt flow rate is (15 grams)/(10 minutes) or less (preferably, (10 grams)/(10 minutes) or less), then the high-density polyethylene can be subjected to injection molding into a sliding element with rigidity and impact resistance.

However, if the melt flow rate is (2 grams)/(10 minutes) or less, then it is difficult to be subjected to injection molding into a precise form such as gear. If the melt flow rate is (30 grams)/(10 minutes) or more, then the injection molding is easy, but the impact resistance and the wear resistance tend to decrease. It is also possible to obtain high-cycle injection molding by adding a crystalline nucleating agent such as dibenzylidene sorbitol compound to the high-density polyethylene. In the case of self-lubricating thermoplastic olefin resin other than polyethylene, suitable injection molding can be selected under the same conditions as above.

Preparation of Sliding Element Based on Values of Base Material:

A combination of materials of the sliding element is selected based on measured values of (rigidity)/(elastic modulus) of a test piece of a target base-material resin (self-lubricating thermoplastic olefin resin) prepared by injection molding. An amount of base material as the target base-material resin is set so as to occupy 75% by volume or more (preferably 90% by volume or more) in the sliding element, the properties of the base-material resin are reflected to the sliding surface, a rigidity reducing material is mixed in the target base-material resin, and the value of (rigidity)/(elastic modulus) of the target base-material resin is thereby made smaller than 45. The rigidity reducing material for the base-material resin is desired so that the material has compatibility with the base-material resin and it is effective in decrease of hardness of the base-material resin at a small amount of mixture. An increased amount of mixture of the rigidity reducing material may affect other properties (e.g., frictional coefficient) and the mechanical strength of the sliding element.

Thermoplastic elastomer being the rigidity reducing material is, for example, olefin elastomer, polyamide elastomer, polyester elastomer, or silicone elastomer.

To reduce the frictional coefficient of the sliding surface (particularly, a sliding surface along which the element is caused to slide with oil lubrication) of the sliding element to be lower than that of the base-material resin, a lubricity enhancing material (lubricity improving material) is mixed, so that the sliding surface is caused to have high lubricity, namely to have a low frictional coefficient. The lubricity enhancing material is mixed by an amount such that a material with great self-lubricating property (generally, a material with self-lubricating property greater than that of the base-material resin) will not generate attacking property against the opposing element.

Examples of the lubricity enhancing material include fluororesin (such as polytetrafluoroethylene resin); solid lubricant with an inorganic layered structure (such as black lead and molybdenum disulfide); and inorganic compound powder (such as stearic acid compound), organic compound (such as montanic acid ester), mineral powder, and oil compound (such as silicone oil and mineral oil), these compounds having self-lubricating property. Generally, the lubricity enhancing material with greater self-lubricating property than that of the target base-material resin is mixed so as to reduce the frictional coefficient of the sliding element to a lower value than that of the base-material resin. However, it is preferable to set the frictional coefficient of the sliding element (composite material) to be lower by 10% or more than that of the base-material resin (more preferably, frictional coefficient lower by 25% or more than that of the base-material resin) to improve the effects of the present invention.

When the lubricity enhancing material is the solid lubricant with the inorganic layered structure, an amount thereof is mixed so that the sliding surface will not generate attacking property against the opposing element. The amount of mixture with which the attacking property against the opposing element is generated is different depending on types of solid lubricant and forms of powder and the like. Consequently, the amount of mixture is decided based on conditions of the solid lubricant. If the amount of mixture of the solid lubricant with the inorganic layered structure is generally 10% by volume or less (volume reference of the sliding element or the composite material), the sliding surface will not have the attacking property against the opposing element.

When the sliding unit is a compact, complicated, and precise sliding unit or sliding device, enhancement of the mechanical strength is desired in terms of its use. In such cases, therefore, an enhancing material is mixed to enhance the mechanical strength of the sliding unit or to enhance the mechanical strength and improvement of slidability.

Examples of the enhancing material include inorganic whisker (such as calcium carbonate whisker); enhanced fiber (such as glass fiber, carbon fiber, and aramid fiber); and powdery filler (such as talk and calcium carbonate). The enhancing material is used under the condition in which enhanced effect to the sliding element is increased (if calcium carbonate whisker, an aspect ratio is 3 to 50). The enhancing material is also mixed with a small amount so that the sliding surface of the sliding unit will not have the attacking property against the opposing element.

Manufacture of Sliding Unit or Sliding Device:

A sliding material is molded into a sliding unit or a sliding device with a desired form by kneading and thermally melting self-lubricating thermoplastic olefin resin as the base material and other materials in a kneader, forming them into a shape such as a pellet or the like required for injection molding, and subjecting the pellet or the like to injection molding. Arbitrary types of means and a device for kneading and of a method and a device for injection molding can be used.

Experiment 1

Experiment 1 carried out in the following manner is explained. A plurality of test pieces (Examples 1 to 2 and Comparative Examples 1 to 4) having different composition of materials was molded, property values shown in Table 1 as follows were measured, and attacking property against the opposing element and wear over time were assessed.

In Example 1 and Example 2, materials for the sliding element used for the bearing element 223 of the embodiment are specifically explained, however, the present invention is not limited to the explanation.

Example 1

Row materials were 79% by volume of high-density polyethylene with a melt flow rate of (5 grams)/(10 minutes), 5% by volume of polyester elastomer, 4% by volume of modified high-density polyethylene, 6% by volume of silicone-containing polyethylene, 5% by volume of calcium carbonate whisker (an aspect ratio: 3 to 50), and 1% by volume of montanic acid ester. The row materials were kneaded and thermally melted by a kneader of a biaxial extruder, and molded into a pellet, and the pellet was molded by injection molding into test pieces for measuring properties. As for the test pieces for measuring properties, bending elastic moduli were measured based on R scale of JIS K7171, and values of Rockwell hardness were measured based on R scale of JIS K7202. The coefficients of dynamic friction were measured by a frictional-coefficient measurement device as shown in FIG. 4 by rotating the device for 20 hours without lubricant based on surface pressure: 0.3 MPa, speed: 10 m/min, temperature: room temperature, and those shaft as follows set as opposing elements: SUS shaft, Al shaft, and resin shaft (made of high-impact polystyrene).

Example 2

Row materials were 69% by volume of high-density polyethylene with a melt flow rate of (5 grams)/(10 minutes), 4% by volume of silicone elastomer, 2% by volume of calcium carbonate whisker, 20% by volume of oil component-containing low-density polyethylene, 4% by volume of silicone-containing silicon dioxide, and 1% by volume of montanic acid ester. The row materials were molded into test pieces for measuring properties similarly to Example 1, and the properties were measured similarly to Example 1.

Comparative Example 1

Row materials were 73% by volume of high-density polyethylene, 15% by volume of polyester elastomer, 5% by volume of maleic anhydride modified high-density polyethylene, and 7% by volume of calcium carbonate whisker, which are the same as Example 1. The row materials were molded into test pieces for measuring properties similarly to Example 1, and the properties were measured similarly to Example 1.

Comparative Example 2

Row materials were 84% by volume of high-density polyethylene, 15% by volume of silicone-containing polyethylene, and 1% by volume of montanic acid ester, which are the same as Example 1. The row materials were molded into test pieces by injection molding, to measure the properties using the test pieces.

Comparative Example 3

Row materials were 94% by volume of polyacetal resin with a melt flow rate of (9 grams)/(10 minutes), 5% by volume of modified high-density polyethylene, and 1% by volume of montanic acid ester. The row materials were molded into test pieces for measuring properties similarly to Example 1, and the properties were measured similarly to Example 1.

Comparative Example 4

A row material was only the high-density polyethylene the same as Example 1, and was molded into test pieces for measuring properties similarly to Example 1, and the properties were measured similarly to Example 1.

Table 1 shows measured results of Examples, and Table 2 shows measured results of Comparative Examples.

TABLE 1

| Component [% by volume] | Example 1 | Example 2 |
|---|---|---|
| High-density polyethylene (base material) | 79 | 69 |
| Polyester elastomer | 5 | |
| Silicone elastomer | | 4 |
| Modified high-density polyethylene | 4 | |
| Calcuim carbonate whisker | 5 | 2 |
| Silicone-containing polyethylene | 6 | |
| Oil component-containing low-density polyethylene | | 20 |
| Silicone-containing silicon dioxide | | 4 |
| Montanic acid ester | 1 | 1 |
| Measured values | | |
| Bending elastic modulus [GPa] | 1.6 | 1.3 |
| Rockwell hardness (R scale) | 58 | 51 |
| (Rockwell hardness)/(bending elastic modulus) | 36 | 39 |
| Coefficient ($\mu$) of dynamic friction of SUS shaft | 0.12 | 0.15 |
| Amount of wear of SUS shaft for 20 hours [mm] | 0.018 | 0.021 |
| Attacking property against SUS shaft | Accepted | Accepted |
| Attacking property against AL shaft | Accepted | Accepted |
| Attacking property against plastic shaft | Accepted | Accepted |

TABLE 2

| Component [% by volume] | Comparative Example 1 | Comparative Example 2 | Comparative Example 3 | Comparative Example 4 |
|---|---|---|---|---|
| High-density polyethylene (base material) | 73 | 84 | | 100 |
| Polyacetal resin | | | 94 | |
| Polyester elastomer | 15 | | | |
| Modified high-density polyethylene | 5 | | 5 | |
| Calcuim carbonate whisker | 7 | | | |
| Silicone-containing polyethylene | | 15 | | |
| Montanic acid ester | | 1 | 1 | |
| Measured values | | | | |
| Bending elastic modulus [GPa] | 1.4 | 1.4 | 2.3 | 1.3 |
| Rockwell hardness (R scale) | 54 | 54 | 117 | 65 |
| (Rockwell hardness)/(bending elastic modulus) | 38 | 38 | 50 | 50 |
| Coefficient ($\mu$) of dynamic friction of SUS shaft | 0.22 | 0.21 | 0.24 | 0.21 |
| Amount of wear of SUS shaft for 20 hours [mm] | 0.026 | 0.044 | 0.02 | 0.051 |
| Attacking property against SUS shaft | Accepted | Accepted | Accepted | Accepted |

TABLE 2-continued

| Component [% by volume] | Comparative Example 1 | Comparative Example 2 | Comparative Example 3 | Comparative Example 4 |
|---|---|---|---|---|
| Attacking property against AL shaft | Accepted | Accepted | Rejected | Accepted |
| Attacking property against plastic shaft | Accepted | Inadequate | Rejected | Inadequate |

Note: In Tables 1 and 2, "Accepted" includes a range from an adequate level to a level as "just accepted", "Inadequate" indicates that the test result did not reach the "accepted" level, and "Rejected" indicates that the test result was rejected.

In Comparative Example 1, the value of (rigidity)/(elastic modulus) is 38, which is within the range according to the present invention, however, the coefficient of dynamic friction is slightly higher than that of the base material of Comparative Example 4. Therefore, the long-lasting lubricity in a region related to "the amount of wear for 20 hours" is not enough, and the attacking property against the plastic shaft is on the boundary between "Accepted" and "Inadequate". In Comparative Example 3, the attacking property against the opposing element is high, which is due to the property specific to polyacetal resin.

According to Tables 1 and 2, it is found that the values of (Rockwell hardness)/(bending elastic modulus) in Examples 1 to 2 and Comparative Examples 1 to 2 are lower than the values in Comparative Example 3 in which the polyacetal resin is the base material and in Comparative Example 4 in which only the base material is used. It is also found that the coefficients of dynamic friction in Examples 1 and 2 are lower than the values in Comparative Example 4 and the other Comparative Examples.

A conventional bearing structure will be explained below.

A developer and toner with a smaller diameter are increasingly used in image forming apparatuses to improve quality of images to be formed. Therefore, various improvements are desired for materials and the bearing structure being a portion in the developing device where toner or the like easily leaks to the outside.

For example, there is a type in which a seal structure is obtained only by fitting a sealing element that has an elastic sealing lip called "V-ring" to a shaft that penetrates a bearing case. The V-ring is a rubber seal ring with a nearly V-shaped cross section formed in such a manner that the elastic sealing lip is integrally formed at one end of the ring body, to be fixed to the shaft, in its shaft direction. The type using the V-ring includes one in which grease is thinly applied to the surface of an element called a retainer to prevent toner leakage and abnormal noise due to friction between the V-ring and the retainer with which the V-ring is made in slidable contact. In this case, the reason that the grease is thinly applied to the retainer is because the grease is prevented from being mixed in the developer. However, because only a small amount of grease is used, the effect of application of the grease is eliminated with time. Moreover, because the grease is applied to the surface of the retainer, the developer may touch the grease, so that the grease may be mixed in the developer. Furthermore, there are some problems that sealing capability with respect to toner with a small particle size is low and the toner may thereby enter the bearing from the V-ring portion.

There is another type in which two sealing elements such as the V-ring and a G-seal are used if the leakage of toner cannot perfectly be prevented only by the V-ring. The G-seal is a rubber seal ring with a nearly G-shaped cross section functioning in such a manner that the shaft is tightly sealed in the radial direction by the elastic sealing lip integrally formed in the inner peripheral portion of the ring body. In this case, the toner passing through the V-ring may sometimes be aggregated due to frictional heat between the G-seal and the shaft at the G-seal portion. If this type of phenomenon once occurs, the mass of toner is growing and enters the developer through a seal portion, which results in failures such as occurrence of abnormal images and locking.

Such failures are difficult to occur in an image forming apparatus called "low-speed machine" in which, for example, the number of revolutions of a drive shaft is about 315 rpm and also in an image forming apparatus called "middle-speed machine" in which, for example, the number of revolutions of the drive shaft is about 411 rpm. However, if an image forming apparatus of a type called "high-speed machine" has the same configuration as above, the number of revolutions of the drive shaft increases to about 468 rpm, and the frictional heat between the V-ring/the G-seal and the retainer/the shaft increases, which causes the failures to occur very easily. For example, if the developing device is continuously driven in the high-speed machine, then the temperature of the device rises up to about 50° C. If heat is generated at a seal portion of the bearing, it is quite possible to locally rise to 70° C. or higher which is a toner softening temperature.

Figure 5:
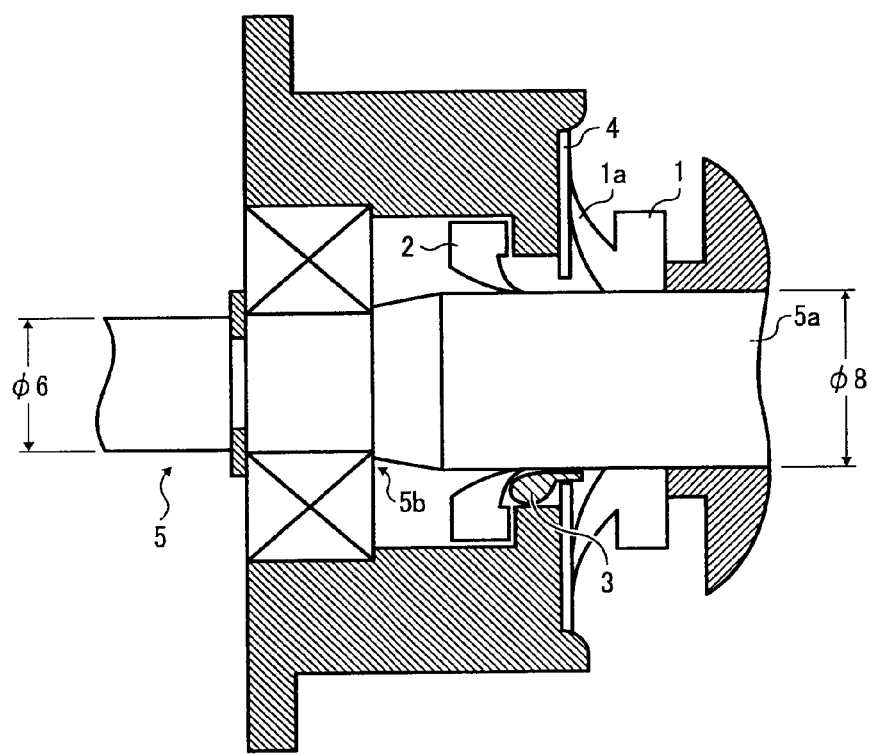
FIG. 5 is a schematic of an example of a conventional bearing structure.

As shown in FIG. 5, Japanese Patent Application Laid-open No. H12-250309 proposes a bearing sealing structure that includes two sealing elements such as a V-ring 1 and a G-seal 2 between which grease 3 is encapsulated. According to the bearing sealing structure, because a sufficient amount of grease 3 is encapsulated between them, long-lasting stable lubricating action can be maintained, and the grease 3 itself can stop toner having entered through a seal portion between the V-ring 1 and a retainer 4.

However, the V-ring 1 used in the proposed bearing sealing structure has a lip 1a that comes in contact with the retainer 4 at a location apart from an outer peripheral surface of a base portion 5a according to its structure. Therefore, a peripheral speed of the contact portion is high and heat generation at the contact portion thereby increases. If the V-ring 1 is used as a bearing seal of a drive shaft 5 with an outer diameter of 6 millimeters, a step 5b is provided as a thrust stop, and thus the V-ring 1 is attached to the base portion 5a with an outer diameter of 8 millimeters. Consequently, a diameter of the seal tip of the V-ring 1 corresponds to about 10 millimeters, of which peripheral speed is about 1.7 times as fast as that of a case of the seal tip when the G-seal 2 is used for the drive shaft with the same outer diameter of 6 millimeters. Therefore, there is little allowance for heat generation when the V-ring 1 is used in the high-speed machine, and thus, toner aggregation due to heat of the surface of the retainer 4 may not be perfectly prevented.

The G-seal is more useful in terms of peripheral speed of the contact portion, however, sealing capability is often inferior to the V-ring. Although there is an example of using two G-seals to improve the sealing capability, a failure as follows may occur. The failure is caused by toner aggregation formed in the bearing portion due to the toner that is accumulated between the two G-seals and finally enters the bearing portion after the bearing sealing structure operates for a long time.

Figure 6:
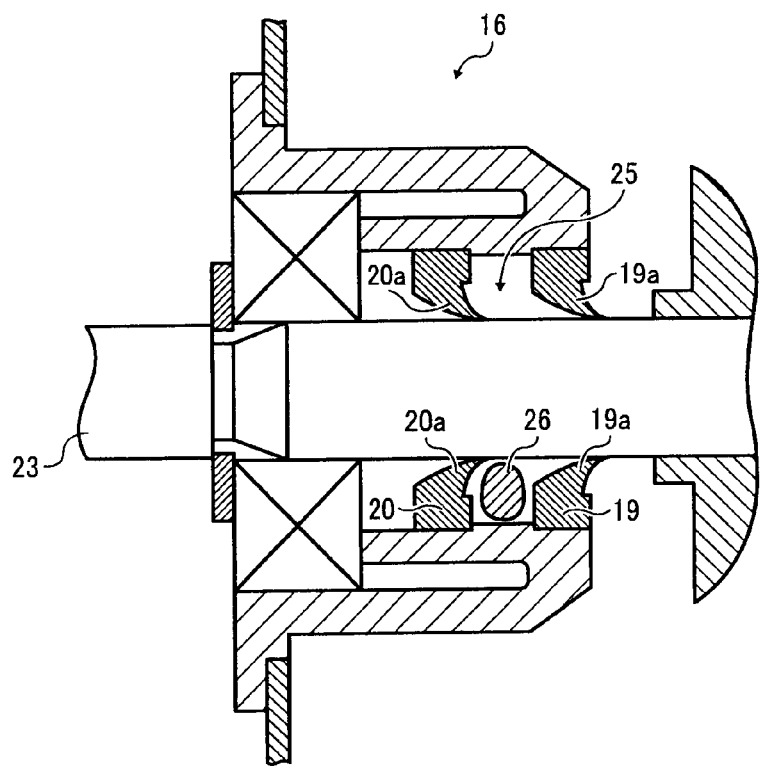
FIG. 6 is a schematic of another example of the conventional bearing structure.

Meanwhile, Japanese Patent Application Laid-open No. 2001-125374 proposes a bearing sealing structure of a developing device for an image forming apparatus and also proposes the developing device capable of stably reducing a sliding load, achieving increased sealing effect, and being excellent in durability. As shown in FIG. 6, the bearing sealing structure is formed in such a manner that a first sealing element 19 and a second sealing element 20 are provided in a bearing portion 16, each of the sealing elements has an elastic sealing lip (19a, 20a) that is made in contact with the outer periphery of a shaft 23 and seals the shaft, and grease 26 is encapsulated in a space 25 between the first and the second sealing elements 19 and 20.

With this feature, the sealing element is made in contact with the outer peripheral surface of the shaft at the location nearer to the center of axle of the rotating shaft, as compared with the V-ring being the sealing element that is made in contact with the bearing at the location apart from the outer peripheral surface of the shaft. If the number of revolutions of the shafts is the same as each other, the peripheral speed of the contact portions in the first and the second sealing elements is lower than that of the V-ring. Therefore, a sliding load between the first/the second sealing elements and the shaft can be reduced, and toner aggregation due to frictional heat can be largely prevented.

Further, because the grease is encapsulated in the space between the first and the second sealing elements, toner entering between the first and the second sealing elements can be stopped by the grease itself and sealed. Moreover, the encapsulated grease works as a lubricant, and this allows less heat generation, which does not lead to toner aggregation. Furthermore, the space in which the grease is encapsulated is sealed by the first and the second sealing elements, and thus, the grease is prevented from leaking to the outside and great sealing effects can be stably obtained over a long period of time.

However, when the developing device with the bearing structure described in Japanese Patent Application Laid-open No. 2001-125374 was continuously used over long periods, abnormal noise occurred from the bearing portion of the sliding bearing.

Further, when the developing device with the bearing structure described in Japanese Patent Application Laid-open No. 2001-125374 was continuously used over long periods, the toner having entered between the first and the second sealing elements could not be stopped by the grease within the space, and thus the toner may pass through the second sealing element and reach the bearing portion. The toner having reached the bearing portion enters between the shaft and the bearing portion to cause toner aggregation, which may cause a drive load of the shaft to be increased. Increased drive load of the shaft causes wear and heat generation between the shaft and the bearing portion to easily occur, which may cause failure of the device such as improper driving.

Therefore, it is desired that the bearing structure of a developing device for an image forming apparatus, the developing device, and the image forming apparatus can stably maintain sealing effect over long periods and are excellent in durability by stably reducing a sliding load and preventing the toner from reaching the bearing portion even if the device is used over long periods.

In recent years, to achieve high image quality which is requirements from market, toner particles used in the image forming apparatus are getting smaller in size. As a result of using the small-sized toner particles for image formation, advantages are faithful reproduction of dots and image quality excellent in the degree of granularity and sharpness. Carrier particles used in two-component developer are also getting smaller in size together with the small-sized toner particles. It is getting clear that the small-sized carrier particles also greatly contribute to high image quality, and, therefore, the small-sized carrier particles are also commercialized together with the small-sized toner particles. In the image forming apparatus using the small-sized toner particles and the small-sized carrier particles, the sealing capability could not be satisfactorily performed in the developing device with the bearing structure described in Japanese Patent Application Laid-open No. 2001-125374, which caused toner leakage or carrier leakage. Moreover, abnormal noise occurred due to continuous driving of the developing device with the bearing structure described in Japanese Patent Application Laid-open No. 2001-125374. Therefore, it is desired to provide the bearing structure of the developing device for the image forming apparatus, the developing device, and the image forming apparatus capable of stably maintaining sealing effect over longer periods and being excellent in durability.

The copier 500 is therefore provided with the developing device 40 that includes the bearing element 223 as the bearing of the developer conveying screw. Specifically, the bearing element 223 includes the sliding element that has characterizing portions according to the present invention as explained in Examples 1 and 2 (hereinafter, sometimes described as "present sliding element").

In the conventional bearing structure (described in Japanese Patent Application Laid-open No. 2001-125374), some failures such as toner leakage, carrier leakage, and abnormal noise have occurred. However, as a result of manufacturing the image forming apparatus using the bearing element according to the present invention, it is found that there are no such failures as explained above in a life length of the machine of 9000K (9 millions of sheets) under the conditions of the copier 500. Meanwhile, in the developing device 40 that includes the bearing element 223 using the sliding element made of the conventional polyacetal material, abnormal noise occurred and the toner leaked from the bearing element 223 with 500K (500 hundreds of sheets) under the conditions of the copier 500.

As shown in Tables 1 and 2, the coefficients of dynamic friction in Examples 1 and 2 when the bearing element is rotated 20 hours are sufficiently low as compared with that of Comparative Example 3 in which the polyacetal resin is used for the base material. Therefore, because the increase in the coefficients of dynamic friction can be prevented in Examples 1 and 2, it can be considered that no abnormal noise occurred in the developing device 40 using the sliding element, which has the characterizing portions according to the present invention, as the bearing element 223 while abnormal noise occurred in the developing device 40 using the sliding element made of the conventional polyacetal resin as the bearing element 223.

The toner leakage and the carrier leakage having occurred in the bearing element 223 using the sliding element made of the conventional polyacetal material did not occur in the bearing element 223 using the sliding element which has the characterizing portions according to the present invention as shown in Examples 1 and 2. It is not known exactly why, however, the followings can be the reasons.

The sliding element is formed of a composite material that contains a self-lubricating thermoplastic olefin resin as the base material and provides a sliding surface that has a frictional coefficient lower than that of the base material. The sliding element formed of the composite material has a softer surface hardness than the conventional sliding element. Because of this, even if slightly larger fine particles are present, the fine particles such as toner particles and carrier particles sink down on the surface of the sliding element, and a load is thereby difficult to occur and the sliding surface of the bearing element 223 is thereby difficult to be damaged. Thus, such inconvenience that a space increases between the sliding surface and the rotating shaft over time is difficult to occur. Besides, if the fine particles are difficult to sink down on the surface of the sliding element and when the fine particles are present between the sliding surface and the rotating shaft, a large space is easily made around the fine particles, and new fine particles thereby easily enter between the sliding surface and the rotating shaft.

On the other hand, if fine particles are easy to sink down on the surface of the sliding element, even if the fine particles are present between the sliding surface and the rotating shaft, a space is difficult to be made around the fine particles, and therefore, new fine particles are difficult to enter between the sliding surface and the rotating shaft. In this manner, the space between the sliding surface and the rotating shaft is difficult to increase and the fine particles hardly enter therebetween as compared with the conventional bearing. Consequently, it can be considered that the bearing element 223 having the characterizing portions according to the present invention can prevent toner leakage and carrier leakage as compared with the bearing element 223 formed of the conventional material.

The inventors of the present invention have found that a material with a value of (Rockwell hardness)/(bending elastic modulus) in a range from 25 to 45 is most suitable for the sliding surface of the device handling fine powder such as toner, of composite materials being materials of the bearing element with which toner leakage and carrier leakage may occur, as compared with the conventional bearing element.

As shown in Tables 1 and 2, the sliding elements of Comparative Examples 1 and 2 are formed of the composite material of the same base material (high-density polyethylene) as these of Examples 1 and 2, and have sufficiently smaller values of (Rockwell hardness)/(bending elastic modulus) than those of Comparative Examples 3 and 4, the values being equivalent to these of the Examples 1 and 2. From the results, it can be considered that even if the bearing elements are formed of the sliding elements according to the Comparative Examples 1 and 2, the toner leakage and the carrier leakage can be prevented in the similar manner to Examples 1 and 2. However, the coefficients μ of dynamic friction after the bearing elements are rotated 20 hours in Comparative Examples 1 and 2 are equivalent to those of Comparative Examples 3 and 4, and these values cannot be reduced to these of Examples 1 and 2. As a result, it can be assumed that the bearing elements formed of the sliding elements according to Comparative Examples 1 and 2 cannot prevent occurrence of abnormal noise, unlike the bearing elements formed of the sliding elements according to Examples 1 and 2.

As shown in Table 1, Example 1 represents the sliding element formed of the composite material in which the base material of high-density polyethylene being thermoplastic olefin resin constitutes 79% by volume, being not less than 75% by volume, of the composite material. From Table 1, it is found that Example 1 has a smaller coefficient μ of the dynamic friction and a less amount of wear than these of Example 2. Specifically, in Example 1, the base material is 75% by volume or more, while in Example 2, the base material is less than 75% by volume. Therefore, it can be considered that the sliding element with 75% by volume or more of the base material can further minimize occurrence of abnormal noise.

As for toner used in the copier 500, toner particles with an average circularity of 0.930 to 0.970 are used. The circularity is defined in the following equation (1).

$$\text{Circularity} = L0/L \quad (1)$$

where, L0 is a circumferential length of a circle having an area equivalent to a projected area of a toner particle, L is a circumferential length of a projected image of the toner particle.

If the average circularity is in a range of 0.930 to 0.970, then respective surfaces of the toner particles are smooth, and each contact area between a toner particle and the photoconductor is small, which allows excellent transfer performance. Toner particles have no angular portions, mixing torque of the developer in the developing device is small and mixing is stably driven, which does not cause defective images. In addition, because there are no angular toner particles in the toner particles to form dots, when the toner particles are press-contacted with the transfer medium upon transfer, the pressure is evenly applied to all the toner particles forming dots, and voids due to improper transfer thereby hardly occur. Because the toner particles are not angular-shaped, grinding force thereof is small, and thus, the toner particles is prevented not to damage the surface of such the photosensitive drum, the charge member, and the bearing member nor wear the surface thereof. Thus, high quality of formed images can be achieved.

However, when toner particles with high circularity are used, the toner particles may scrape through the bearing element and abnormal noise is thereby produced in the bearing element formed of the sliding element with the composite material containing the conventional polyacetal as the base material. Meanwhile, no abnormal noise occurred in the bearing element formed of the present sliding element. Specifically, by using the present sliding element for the bearing element 223, abnormal noise can be prevented even if toner particles with high circularity easily enter the bearing portion.

Table 3 shows how abnormal noises occur in the case of using spherical toner and in the case of using pulverized toner when the conventional sliding element with polyacetal base material is used for the bearing element and when the present sliding element is used for the bearing element. In Table 3, "Accepted" indicates that no abnormal noise occurred and "Rejected" indicates that abnormal noise occurred.

TABLE 3

|  | Polyacetal | Present sliding element |
|---|---|---|
| Spherical toner | Rejected | Accepted |
| Pulverized toner | Accepted | Accepted |

Measuring method of the circularity is explained below.

The circularity SR, for example, can be measured by using Particle Analyzer FPIA-1000 manufactured by Toa Medical Electronics. At first, water of 100 to 150 milliliters from which impurity solid is previously removed is put into a container, a surfactant (preferably, alkylbenzene sulfonic acid) being a dispersing agent is added by 0.1 to 0.5 milliliter to the water, and sample to be measured is further added thereto by about 0.1 to 0.5 gram. A suspension with the sample dispersed therein is dispersed for about 1 to 3 minutes by an ultrasonic disperser, and concentration of a dispersing solution is controlled to 3,000 to 10,000 pieces/μl, and each shape and particle size of toner particles are thereby measured.

Toner particles containing crystalline polyester are used in the copier 500.

On one hand, the crystalline polyester is excellent in low temperature fixability, while on the other hand, if the crystalline polyester enters the sliding surface, it is melted and is thereby easily fixed to the rotating shaft. This is easy to cause an increase in the frictional coefficient on the sliding surface and occurrence of abnormal noise. However, by using the present sliding element, the failures were reduced.

Toner particles used in the copier 500 have a volume-average particle size of from 3 micrometers to 7 micrometers and a ratio (Dv/Dp) of a weight-average particle size (Dv) to a number-average particle size (Dp) in a range from 1.00 to 1.40.

If small-sized toner particles and small-sized carrier particles were used for the bearing portion formed of the conventional sliding element, toner leakage, carrier leakage, and abnormal noise occurred. Meanwhile, the bearing element 223 formed of the present sliding element was used and assessed, and as a result, even if the conventional toner particles with 6 micrometers or more were used, abnormal noise could be minimized, and toner leakage and carrier leakage could be improved. Moreover, if toner particles with a volume-average particle size of from 3 micrometers to 6 micrometers and a ratio (Dv/Dp) of the weight-average particle size (Dv) to the number-average particle size (Dp) in a range from 1.00 to 1.40 were used, load torque did not increase, almost no abnormal noise occurred, and also toner leakage and carrier leakage did not occur at all. The reason may be considered that the particle sizes are small and are uniformly distributed.

The followings can be considered as the factor.

Specifically, the surface roughness of the bearing element depends on the surface roughness of a mold. The surface roughness of a molded piece is generally equal to or less than 10 micrometers. If conventional toner particles, because the particle size is large or the particle sizes are not uniformly distributed, the toner particles cannot fit in irregularities of the surface of the molded piece, which causes a large load to occur between the toner particles on the sliding surface and the sliding element. In the case of the toner particles used this time, because the particle size is 5 micrometers and the particle size distribution is uniform, the toner particles can successfully fit in the irregularities of the sliding surface, and as a result, it is found that no load occurs. Moreover, because the present sliding element has softer Rockwell hardness than that of the conventional sliding element, it is considered that even if toner particles with a comparatively large particle size are present, the toner particles may enter the sliding element and a load is thereby difficult to occur.

Besides, the resin-based sliding element used as the bearing element 223 is manufactured by injection molding, and is used for the bearing for the developer conveying screw of the developing device 40, the bearing being a portion in contact with toner particles and carrier particles which are fine particles.

The sliding element can also be manufactured by cutting work or using a resin mold or the like, however, when the sliding element is formed by injection molding, it is possible to improve protection against scrape-through of fine particles on the sliding surface of the sliding element and to reliably prevent toner leakage and carrier leakage.

The copier 500 uses the developing device 40 as a developing unit that develops an electrostatic latent image on the surface of the photosensitive element 101 being a latent-image carrier. Specifically, the developing device 40 includes the bearing element 223 that is formed of the present sliding element and supports the rotating shaft of the developer conveying screw to the housing 40*a* of the device. The developing device 40 can prevent toner leakage and carrier leakage, which enables the copier 500 to prevent inside the device from being contaminated caused by the toner leakage or by the carrier leakage through any bearing of the conveying screws in the developing device 40. Moreover, the developing device 40 can prevent occurrence of abnormal noise, which allows a longer operating life of the device.

Experiment 2

Experiment 2 carried out in the following manner is explained. Durability was assessed by using a developing device that includes the bearing element having the characterizing portions according to the present invention and a developing device that includes the conventional bearing element.

Method of Assessing Durability:

The bearing of the developer conveying screw incorporated in a developing unit in Digital full-color multifunction product (MFP): imagio Neo C600 Pro manufactured by RICOH COMPANY, LTD was removed, and the bearing element 223 (the bearing made of the composite material the same as Example 1) having the characterizing portions according to the present invention explained with reference to FIGS. 1A and 1B was inserted, to modify the developing unit.

A developing unit as follows is called "developing unit A". The developing unit A is obtained by applying the bearing structure the same as that of the developing device described in FIG. 9 (not shown) in Japanese Patent Application Laid-open No. 2001-125374 to the developing unit incorporated in Digital full-color MFP: imagio Neo C600 Pro manufactured by RICOH COMPANY, LTD and using a bearing formed of Mullite™. Further, a developing unit as follows is called "developing unit B". The developing unit B is obtained by replacing a bearing with the bearing element 223 (the bearing made of the composite material the same as Example 1) having the characterizing portions according to the present invention. Furthermore, a developing unit as follows is called "developing unit C". The developing unit C is obtained by forming the bearing structure as shown in FIG. 1 similarly to the developing unit B and using polyacetal (POM) being a general-purpose sliding material as a material of the bearing element 223.

Base resin of the Mullite™ is POM and a zinc compound is mixed therein but a fluorinated compound is not mixed therein. The bearing of the developing unit A was observed, and as a result, it is found that there were many bubbles of about 10 micrometers.

In Experiment 2, each durability was assessed using the developing units A, B, and C.

To assess the durability, a single drive unit that can drive the developing units A, B, and C in the same manner as drive of the digital full-color MFP was manufactured and testing was conducted. The single drive unit is formed by fixing the developing unit with two side plates on the flat plate and further disposing a motor on the flat plate, so that the developing roller and the developer conveying screw can be made to rotate through the motor at an arbitrary speed.

Each of the developing units was filled with a developer prepared by mixing color toner (circularity: 0.960, volume-average particle size: 5.4 micrometers, and Dv/Dp: 1.15) manufactured in a method explained later with small-sized carrier particles used in the Digital full-color MFP: imagio Neo C600 Pro manufactured by RICOH COMPANY, LTD, at a toner concentration of 7%.

Each of the developing units filled with the developer was set to the single drive unit, and the developing roller and the screw were made to rotate at a speed 1.24 times of the number of revolutions driven by Digital full-color MFP: imagio Neo C600 Pro manufactured by RICOH COMPANY, LTD, for 600 hours (On: 55 seconds, Off: 5 seconds).

In the developing unit A, toner leakage and carrier leakage occurred in 100 hours, and abnormal noise started in 200 hours, and much of toner leakage occurred in 300 hours. Thus, assessment of the developing unit A was stopped because of inadequate durability.

In the developing unit B, no toner leakage and carrier leakage nor abnormal noise occurred even in 600 hours.

In the developing unit C, toner leakage and carrier leakage occurred and abnormal noise started in 50 hours, and much of toner leaked in 200 hours. Thus, assessment of the developing unit C was stopped because of inadequate durability.

As for the copier 500, the example of applying the bearing element formed of the present sliding element to the developer conveying screw in the developing device 40 is explained. More specifically, in the present embodiment, the rotator of which rotating shaft is supported to the housing by the bearing element formed of the present sliding element is the screw 220 as the developer conveying screw. The screw 220 is an element that comes in contact with the developer being fine particles, and by using the bearing element 223 formed of the present sliding element as the bearing of the screw 220, it is possible to prevent abnormal noise which may occur with time and also prevent toner leakage and carrier leakage. The rotator supported by the bearing element formed of the present sliding element is not limited to the screw 220 in the developing device 40. For example, the rotator is applicable to the bearing of a toner conveying screw provided in a toner supply device. By applying the rotator to the bearing of the toner conveying screw that comes in contact with toner being fine particles, it is possible to prevent abnormal noise which may occur with time and also prevent toner leakage. Moreover, the rotator is applicable to the bearing of a rotating shaft of any rotator that does not come in contact with the fine particles such as toner and carrier. If the rotator is applied to the bearing of the rotator that does not come in contact with the fine particles, there is no effect to prevent toner leakage and carrier leakage or the like, however, occurrence of abnormal noise can be minimized as compared with the conventional bearing elements.

Toner is explained below.

The toner is obtained by performing cross linked and/or elongation reaction between toner material solution, in which at least polyester prepolymer containing functional group including nitride atom, colorant, mold lubricant is distributed in organic solvent, and water-based solvent.

Polyester is obtained by a polycondensation reaction of a polyhydric alcohol compound and a polycarboxylic compound.

Dihydric alcohols (DIO) and trihydric or higher polyhydric alcohols (TO) are examples of the polyhydric alcohol compounds (PO). (DIO) by itself or a mixture of (DIO) and a small amount of (TO) is desirable as (PIO). Alkylene glycols (ethylene glycol, 1,2-propylene glycol, 1,3-propylene glycol, 1,4-butane diol, 1,6-hexane diol etc.), alkylene ether glycols (diethylene glycol, triethylene glycol, dipropylene glycol, polyethylene glycol, polypropylene glycol, polytetramethylene ether glycol etc.), alicyclic diols (1,4-cyclohexane dimethanol, hydrogenated bisphenol A etc.), bisphenols (bisphenol A, bisphenol F, bisphenol S etc.), alkylene oxide adducts (ethylene oxide, propylene oxide, butylene oxide etc.) of the alicyclic diols mentioned earlier, and alkylene oxide adducts (ethylene oxide, propylene oxide, butylene oxide etc.) of the bisphenols mentioned earlier are examples of dihydric alcohols (DIO). Alkylene glycols of carbon number 2 to 12 and alkylene oxide adducts of bisphenols are desirable as dihydric alcohols. Alkylene oxide adducts of bisphenols and a combination of alkylene oxide adducts of bisphenols and alkylene glycols of carbon number 2 to 12 are especially desirable as dihydric alcohols. Examples of trihydric or higher polyhydric alcohols (TO) are trihydric to octahydric alcohols or higher polyaliphatic alcohols (glycerin, trimethylol ethane, trimethylol propane, pentaerythritol, sorbitol etc.), triphenols or higher polyphenols (such as trisphenol PA, phenol novolac, cresol novolac etc.), and alkylene oxide adducts of the triphenols or higher polyphenols mentioned earlier.

Examples of the polycarboxylic acids (PC) are dicarboxylic acid (DIC) and tricarboxylic or higher polycarboxylic acids (TC). (DIC) by itself or a mixture of (DIC) and a small amount of (TC) is desirable as (PC). Examples of the dicarboxylic acids (DIC) are alkylene dicarboxylic acids (succinic acid, adipic acid, sebacic acid etc.), alkenylene dicarboxylic acids (maleic acid, fumaric acid etc.), aromatic carboxylic acids (phthalic acid, isophthalic acid, terephthalic acid, naphthalene dicarbonic acid etc.). Alkenylene dicarboxylic acids of carbon number 4 to 20 and aromatic dicarboxylic acids of carbon number 8 to 20 are desirable as dicarboxylic acids (DIC). Examples of tricarboxylic or higher polycarboxylic acids (TC) are aromatic polycarboxylic acids of carbon number 9 to 20 (trimellitic acid, pyromellitic acid etc.). Further, causing acid anhydrides of the compounds mentioned earlier, or lower alkyl esters (methyl ester, ethyl ester, isopropyl ester etc.) to react with the polyhydric alcohols (PO) also enables to obtain the polycarboxylic acids (PC).

A ratio of the polyhydric alcohols (PO) and the polycarboxylic acids (PC), which is expressed as an equivalent ratio (OH)/(COOH) of a hydroxyl group (OH) and a carboxyl group (COOH) is normally 2/1 to 1/1. A ratio of 1.5/1 to 1/1 is desirable, and a ratio of 1.3/1 to 1.02/1 is further desirable.

In the polycondensation reaction of the polyhydric alcohols (PO) and the polycarboxylic acids (PC), the polyhydric alcohols (PO) and the polycarboxylic acids (PC) are heated to 150° to 280° C. in the presence of a commonly known esterification catalyst such as tetra butoxy titanate, dibutyltin oxide etc. Pressure is reduced if required and water generated during the reaction is distilled to obtain a polyester that includes a hydroxyl group. A hydroxyl group number of greater than or equal to 5 is desirable for the polyester. An acid number of the polyester is normally 1 to 30, and an acid number of 5 to 20 is desirable. Causing the polyester to include the acid number increases the negative electrostatic charge of the toner. Further, when fixing the toner on a recording sheet, the acid number enhances affinity of the recording sheet and the toner and also enhances low temperature fixability. However, if the acid number exceeds 30, a stability of the electrostatic charge is adversely affected, especially with respect to environmental variations.

A weight average molecular weight of the polyester is 10000 to 400,000 and a weight average molecular weight of 20000 to 200,000 is desirable. A weight average molecular weight of less than 10000 causes anti-offset ability of the toner to deteriorate and is not desirable. Further, the weight average molecular weight exceeding 400,000 causes the low temperature fixability of the toner to deteriorate and is not desirable.

Apart from the unmodified polyester, which is obtained by the polycondensation reaction mentioned earlier, a urea modified polyester is also desirable and included. For obtaining the urea modified polyester, a carboxyl group or a hydroxyl group at the end of the polyester, which is obtained by the polycondensation reaction, is caused to react with a polyisocyanate compound (PIC) to get a polyester prepolymer (A) that includes an isocyanate group. The polyester prepolymer (A) is caused to react with amines and during the reaction, a molecular chain is subjected to any one of the crosslinking reaction or the elongation reaction or both to obtain the urea modified polyester.

Examples of polyisocyanate compounds (PIC) are aliphatic polyisocyanates (tetramethylene diisocyanate, hexamethylene diisocyanate, 2,6-diisocyanatomethyl caproate etc.), alicyclic polyisocyanates (isophorone diisocyanate, cyclohexyl methane diusocyanate etc.), aromatic diisocyanates (tolylene diisocyanate, diphenyl methane diisocyanate etc.), aromatic aliphatic diisocyanates (a,a,a',a'-tetramethyl xylylene diisocyanate etc.), isocyanates, compounds that are obtained by blocking the polyisocyanates mentioned earlier using phenol derivatives, oximes, caprolactum etc., and combinations of two or more types of the compounds mentioned earlier.

A ratio of the polyisocyanate compounds (PIC) which is expressed as an equivalent ratio (NCO)/(OH) of an isocyanate group (NCO) and a hydroxyl group (OH) of the polyester that includes a hydroxyl group, is normally 5/1 to 1/1. A ratio of 4/1 to 1.2/1 is desirable, and a ratio of 2.5/1 to 1.5/1 is further desirable. If the ratio of (NCO)/(OH) exceeds 5, the low temperature fixability of the toner deteriorates. If a mole ratio of (NCO) is less than one, when using the urea modified polyester, a urea content in the polyester decreases and the anti-offset ability of the toner deteriorates.

An amount of the polyisocyanate compound (PIC) component in the polyester prepolymer (A) that includes an isocyanate group is normally 0.5 to 40% by weight. An amount of 1 to 30% by weight is desirable, and an amount of 2 to 20% t by weight is further desirable. If the amount of the polyisocyanate compound (PIC) component is less than 0.5% by weight, the anti-offset ability of the toner deteriorates and maintaining a balance between heat resistant storability and the low temperature fixability of the toner becomes difficult. Further, if the amount of the polyisocyanate compound (PIC) component exceeds 40% by weight, the low temperature fixability of the toner deteriorates.

A number of isocyanate groups included in the polyester prepolymer (A) per molecule is normally greater than or equal to one. An average of 1.5 to 3 isocyanate groups per molecule are desirable and an average of 1.8 to 2.5 isocyanate groups per molecule are further desirable. If the number of isocyanate groups per molecule is less than one, a molecular weight of the urea modified polyester decreases and the anti-offset ability of the toner deteriorates.

Examples of amines (B) which are caused to react with the polyester prepolymer (A) are diamine compounds (B1), triamines or higher polyamine compounds (B2), amino alcohols (B3), amino mercaptans (B4), amino acids (B5), and compounds (B6) in which amino groups of B1 to B5 are blocked.

Examples of the diamine compounds (B1) are aromatic diamines (phenylene diamine, diethyl toluene diamine, 4,4'-diamineodiphenyl methane etc.), alicyclic diamines (4,4'-di-amino-3,3'-dimethyl dicyclohexyl methane, diamine cyclohexane, isophorone diamine etc.), and aliphatic diamines (ethylene diamine, tetramethylene diamine, hexamethylene diamine etc.). Examples of the triamines or higher polyamine compounds (B2) are diethylene triamine and triethylene tetramine. Examples of the amino alcohols (B3) are ethanolamine and hydroxyethyl aniline. Examples of the amino mercaptans (B4) are aminoethyl mercaptan and aminopropyl mercaptan. Examples of the amino acids (B5) are aminopropionic acid and aminocaproic acid. Ketimine compounds and oxazolidine compounds, which are obtained from the amines B1 to B5 mentioned earlier and ketones (acetone, methyl ethyl ketone, methyl isobutyl ketone etc.), are examples of the compounds (B6) wherein the amino groups of B1 to B5 are blocked. Among the amines (B), the diamine compounds of B1 and the compounds that include B1 and a small amount of B2 are desirable.

A ratio of the amines (B), which is expressed as an equivalent ratio (NCO)/(NHx) of an isocyanate group (NCO) from the polyester prepolymer (A) that includes the isocyanate group and an amino group (NHx) from the amines (B), is normally 1/2 to 2/1. A ratio of 1.5/1 to 1/1.5 is desirable, and a ratio of 1.2/1 to 1/1.2 is further desirable. If the ratio (NCO)/(NHx) becomes greater than 2 or less than 1/2, the molecular weight of the urea modified polyester is reduced and the anti-offset ability of the toner deteriorates.

The urea modified polyester can also include urethane linkages along with urea linkages. A mole ratio of an amount of the urea linkages and an amount of the urethane linkages is normally 100/0 to 10/90. A mole ratio of 80/20 to 20/80 is desirable and a mole ratio of 60/40 to 30/70 is further desirable. If the mole ratio of the urea linkages is less than 10 percent, the anti-offset ability of the toner deteriorates.

The urea modified polyester is manufactured using a one shot method etc. The polyhydric alcohols (PO) and the polycarboxylic acids (PC) are heated to 150° to 280° C. in the presence of a commonly known esterification catalyst such as tetra butoxy titanate, dibutyltin oxide etc. Pressure is reduced if required and water generated during the reaction is distilled to obtain the polyester that includes the hydroxyl group. Next, the polyester is caused to react with polyisocyanate (PIC) at 40° to 140° C. to get the polyester prepolymer (A) that includes an isocyanate group. Next, the polyester prepolymer (A) is caused to react with the amines (B) at 0° to 140° C. to get the urea modified polyester.

When causing the polyester to react with (PIC) and when causing (A) to react with (B), a solvent can also be used if required. Examples of the solvents that can be used are aromatic solvents (toluene, xylene etc.), ketones (acetone, methyl isobutyl ketone etc.), esters (ethyl acetate etc.), amides (dimethyl formamide, dimethyl acetoamide etc.), and ethers (tetrahydrofuran etc.) that are inactive with respect to the isocyanates (PIC).

Further, during any one of the crosslinking reaction or the elongation reaction or both between the polyester prepolymer (A) and the amines (B), a reaction terminator can also be used if required and the molecular weight of the obtained urea modified polyester can be regulated. Examples of the reaction terminator are monoamines (diethylamine, dibutylamine, butylamine, laurylamine etc.) and compounds (ketimine compounds) in which the monoamines are blocked.

The weight average molecular weight of the urea modified polyester is normally greater than or equal to 10,000. A weight average molecular weight of 20,000 to 100,000,000 is desirable and a weight average molecular weight of 30,000 to 1,000,000 is further desirable. If the weight average molecular weight of the urea modified polyester is less than 10,000, the anti-offset ability of the toner deteriorates. When using the unmodified polyester, a number average molecular weight of the urea modified polyester is not especially limited, and any number average molecular weight that is easily converted into the weight average molecular weight can be used. When using the urea modified polyester by itself, the number average molecular weight of the urea modified polyester is normally 2,000 to 15,000. A number average molecular weight of 2,000 to 10,000 is desirable and a number average molecular weight of 2,000 to 8,000 is further desirable. The number average molecular weight of the urea modified polyester exceeding 20,000 results in deterioration of the low temperature fixability and the gloss of the toner when the toner is used in a full color device.

Using a combination of the unmodified polyester and the urea modified polyester enables to enhance the low temperature fixability of the toner and the gloss when the toner is used in a full color image forming apparatus 100. Thus, using a combination of the unmodified polyester and the urea modified polyester is desirable than using the urea modified polyester by itself. Further, the unmodified polyester can also include polyester that is modified using chemical linkages other than the urea linkages.

At least a portion of the unmodified polyester and the urea modified polyester being mutually compatible is desirable for the low temperature fixability and the anti-offset ability. Thus, a similar composition of the unmodified polyester and the urea modified polyester is desirable.

A weight ratio of the unmodified polyester and the urea modified polyester is normally 20/80 to 95/5. A weight ratio of 70/30 to 95/5 is desirable, a weight ratio of 75/25 to 95/5 is further desirable, and a weight ratio of 80/20 to 93/7 is especially desirable. If the weight ratio of the urea modified polyester is less than 5 percent, the anti-offset ability of the toner deteriorates and maintaining a balance between heat resistant storability and the low temperature fixability of the toner becomes difficult.

A glass transition point ($T_g$) of a binder resin that includes the unmodified polyester and the urea modified polyester is normally 45° C. to 65° C. A glass transition point of 45° C. to 60° C. is desirable. If the glass transition point is less than 45° C., a heat resistance of the toner deteriorates. If the glass transition point exceeds 65° C., the low temperature fixability of the toner becomes insufficient.

Because the urea modified polyester is likely to remain on the surface of the obtained parent toner particles, regardless of the low glass transition point, heat resistant storability of the toner is favorable compared to a commonly known polyester type toner.

All commonly known dyes and pigments can be used as colorants. Examples of the colorants that can be used are carbon black, nigrosine dye, iron black, naphthol yellow S, hansa yellow (10G, 5G, G), cadmium yellow, yellow iron oxide, yellow ocher, chrome yellow, titanium yellow, polyazo yellow, oil yellow, hansa yellow (GR, A, RN, R), pigment yellow L, benzidine yellow (G, GR), permanent yellow (NCG), vulcan fast yellow (5G, R), tartrazine lake, quinoline yellow lake, anthrazane yellow BGL, isoindolinone yellow, red iron oxide, minium, red lead, cadmium red, cadmium mercury red, antimony vermilion, permanent red 4R, para red, fire red, parachloro-ortho-nitroaniline red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmine 6B, pigment scarlet 3B, Bordeaux 5B, toluidine maroon, permanent bordeaux F2K, helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue alkali blue lake, peacock blue lake, Victoria blue lake, metal-free phthalocyanine blue, phthalocyanine blue, fast sky blue, indanthrene blue (RS, BC), indigo, ultramarine blue, Prussian blue, anthraquinone blue, fast violet B, methyl violate lake, cobalt purple, Manganese purple, dioxane violate, anthraquinone violet, chrome green, zinc green, chrome oxide, pyridian, emerald green, pigment green B, naphthol green B, green gold, acid green lake, malachite green lake, phthalocyanine green, anthraquinone green, titanium oxide, zinc white, lithopone and mixtures of the colors mentioned earlier. A colorant content is normally 1 to 15% by weight with respect to the toner, and a colorant content of 3 to 10% by weight is desirable.

The colorant can also be used as a master batch that is combined with the resin. Styrenes such as polystyrene, poly-p-chlorostyrene, polyvinyl toluene, substitute polymers of the styrenes mentioned earlier, copolymers of the styrenes mentioned earlier with vinyl compounds, polymethyl methacrylate, polybutyl methacrylate, polyvinyl chloride, polyvinyl acetater, polyethylene, polypropylene, polyester, epoxy resin, epoxypolyol resin, polyurethane, polyamide, polyvinyl butylal, polyacrylic acid resin, rodine, modified rodine, terpene resin, aliphatic or alicyclic hydrocarbon resin, aromatic petroleum resin, chlorinated paraffin, paraffin wax etc. are examples of the binder resins that are used in the manufacture of the master batch or that are mixed with the master batch. The binder resins mentioned earlier can be used independently or as a mixture.

Commonly known electric charge controllers can be used. Examples of the electric charge controllers are nigrosine dyes, triphenyl methane dyes, chromium-containing metal complex dyes, chelate molybdate pigment, rhodamine dyes, alkoxy amine, quaternary ammonium salt (includes fluorine modified quaternary ammonium salt), alkyl amide, phosphorus in element or compound form, tungsten in element or compound form, fluorine series activator, salicylic acid metal salt and metal salt of salicylic acid derivative. Specific examples of the electric charge controllers are bontron 03 that is a nigrosine series dye, bontron P-51 that is a quaternary ammonium salt, bontron S-34 that is a metal-containing azo dye, E-82 that is an oxynaphthoe acid metal complex, E-84 that is a salicylic acid metal complex, E-89 that is a phenol condensate (the chemicals mentioned earlier are manufactured by Orient Chemical Industries), TP-302 that is a quaternary ammonium salt molybdenum complex, TP-415 (the chemicals mentioned earlier are manufactured by Hodogaya Chemicals Company), copy charge PSY VP2038 that is a quaternary ammonium salt, copy blue PR that is a triphenyl methane derivative, copy charge NEG VP2036 that is a quaternary ammonium salt, copy charge NX VP434 (the chemicals mentioned earlier are manufactured by Hochst Company), LRA-901, LR-147 that is a boron complex (manufactured by Japan Carlit Company), copper phthalocyanine, perylene, quinacridone, azo type pigment, and other polymeric compounds that include functional groups such as sulfonic acid group, carboxyl group, quaternary ammonium salt etc. Among the materials mentioned earlier, the materials that especially control the toner to the negative polarity are desirably used. A usage amount of the electric charge controller is decided according to a toner manufacturing method that includes a type of the binder resin, presence of the additive agent that is used if necessary, a dispersion method etc. Thus, the usage amount of the electric charge controller is not uniquely limited. However, the usage amount in a range of 0.1 to 10 parts by weight of the electric charge controller with respect to 100 parts by weight of the binder resin is desirably used. A range of 0.2 to 5 parts by weight of the electric charge controller is desirable. If the usage amount of the electric charge controller exceeds 10 parts by weight, the excess electrostatic charge of the toner reduces the effect of the electric charge controller and increases the electrostatic attraction between the toner and the developing roller. Due to this, fluidity of the developer and image density are reduced.

When dispersed with the binder resin, wax which includes a low melting point of 50° C. to 120° C. functions effectively as the mold releasing agent between a fixing roller and a toner surface. Due to this, wax is effective against heat offset and removes a necessity to coat the fixing roller with the mold releasing agent. Examples of materials, which are used as a wax component, are described below. Examples of wax materials are plant wax such as carnauba wax, cotton wax, wood wax, rice wax etc., animal wax such as beeswax, lanolin etc., mineral wax such as ozokerite, cercine etc., and petroleum wax such as paraffin, microcrystalline, petrolatum etc. Further, apart from natural wax mentioned earlier, synthetic hydrocarbon wax such as Fischer-Tropsch wax, polyethylene wax, and synthetic wax such as ester, ketone, and ether can also be used. Further, fatty amides such as 1,2-hydroxystearic acid amide, stearic acid amide, phthalic anhydride imide, chlorinated hydrocarbon, and crystalline polymer molecules that include a long alkyl group in a side chain, in other words, polyacrylate homopolymers or copolymers (for example, copolymers of n-stearyl acrylate-ethyl methacrylate etc.) such as poly-n-stearyl methacrylate, poly-n-lauryl methacrylate can also be used.

The electric charge controller and the mold releasing agent can also be melted and mixed with the master batch and the binder resin. Further, the electric charge controller and the mold releasing agent can also be added when the master batch and the binder resin are dissolved and dispersed in the organic solvent.

Inorganic particles are desirably used as the external additive agent for supplementing fluidity, developability, and electrostatic charge of the toner. A primary particle diameter of $5 \times 10^{-3}$ to 2 (μm) is desirable for the inorganic particles and a primary particle diameter of $5 \times 10^{-3}$ to 0.5 (μm) is further desirable. Further, a specific surface area of 20 to 500 (m$^2$/g) according to Brunauer Emmet Teller (BET) method is desirable for the inorganic particles. A usage percentage of 0.01 to 5% by weight of the toner is desirable for the inorganic particles and a usage percentage of 0.01 to 2.0% by weight is especially desirable.

Specific examples of the inorganic particles are silica, alumina, titanium oxide, barium titanate, magnesium titanate, calcium titanate, strontium titanate, zinc oxide, tin oxide, silica sand, clay, mica, silica apatite, diatomite, chromium oxide, serium oxide, colcothar, antimony trioxide, magnesium oxide, zirconium oxide, barium sulphate, barium carbonate, calcium carbonate, silicon carbide, silicon nitride etc. Especially, using a combination of hydrophobic silica particles and hydrophobic titanium oxide particles as a fluidity enhancer is desirable. Especially, if hydrophobic silica particles and hydrophobic titanium oxide particles having an average particle diameter of less than or equal to $5 \times 10^{-2}$ (μm) are mixed by stirring, electrostatic power and van der Waals power of the toner are significantly enhanced. Due to this, the fluidity enhancer is not detached from the toner even if the fluidity enhancer is mixed by stirring inside a developing device for getting a desired electrostatic charge level. Thus, a better image quality can be obtained by preventing occurrence of dots and the transfer residual toner can be reduced.

Although using the titanium oxide particles is desirable for better environmental stability and image density stability, because a charge rising property of the toner increasingly deteriorates, if an additive amount of the titanium oxide particles becomes more than an additive amount of the silica particles, influence of the side effect mentioned earlier is likely to increase. However, if the additive amounts of the hydrophobic silica particles and the hydrophobic titanium oxide particles are in a range of 0.3 to 1.5% by weight, the charge rising property of the toner is not significantly affected and a desired charge rising property can be obtained. In other words, a stable image quality can be obtained even if the image is repeated copied.

The manufacturing method of the toner is explained next. Although the manufacturing method explained below is desirable, the present invention is not to be thus limited.

First, the coloring agent, the unmodified polyester, the polyester prepolymer that includes an isocyanate group, and the mold releasing agent are dispersed in the organic solvent to form the toner material solution.

A volatile organic solvent having a boiling point of less than 100° C. is desirable for easy removal of the organic solvent after formation of the parent toner particles. To be specific, toluene, xylene, benzene, tetrachlorocarbon, chloromethylene, 1,2-dichloroethane, 1,1,2-trichloroethane, trichloroethylene, chloroform, monochlorobenzene, dichloroethylidene, methyl acetate, ethyl acetate, methyl ethyl ketone, methyl isobutyl ketone etc. can be used alone or a combination of two or more chemicals mentioned earlier can be used. Especially, aromatic solvents such as toluene, xylene and halogenated hydrocarbons such as chloromethylene, 1,2-dichloroethane, chloroform, tetrachlorocarbon are desirable. A usage amount of the organic solvent is normally 0 to 300 parts by weight of the organic solvent with respect to 100 parts by weight of the polyester prepolymer. A usage amount of 0 to 100 parts by weight of the organic solvent is desirable and a usage amount of 25 to 70 parts by weight of the organic solvent is further desirable.

Next, the toner material solution is emulsified in the aqueous solvent in the presence of a surface active agent and resin particles.

Water alone can be used as the aqueous solvent. Further, aqueous solvents that include organic solvents such as alcohols (methanol, isopropyl alcohol, ethylene glycol etc.), dimethyl formamide, tetrahydrofuran, cellosolves (methyl cellosolve etc.), lower ketones (acetone, methyl ethyl ketone etc.) can also be used.

A usage amount of the aqueous solvent is normally 50 to 2000 parts by weight of the aqueous solvent with respect to 100 parts by weight of the toner material solution. A usage amount of 100 to 1000 parts by weight of the aqueous solvent is desirable. If the usage amount of the aqueous solvent becomes less than 50 parts by weight, the dispersed state of the toner material solution deteriorates and toner particles of a predetermined particle diameter cannot be obtained. If the usage amount of the aqueous solvent exceeds 20000 parts by weight, toner manufacturing is not economical.

A dispersing agent such as the surface active agent or the resin particles is suitably added for enhancing the dispersion in the aqueous solvent. Examples of the surface active agent are anionic surface active agents such as alkylbenzene sulfonate, a-olefine sulfonate, ester phosphate, amine salts such as alkylamine salts, amino alcohol fatty acid derivatives, polyamine fatty acid derivatives, imidazolin, cationic surface active agent of quaternary ammonium salt type such as alkyl trimethyl ammonium salt, dialkyl dimethyl ammonium salt, alkyl dimethyl benzyl ammonium salt, pyridium salt, alkyl isoquinolium salt, chlorobenzetonium, nonionic surface active agent such as fatty acid amide derivatives, polyhydric alcohol derivatives, and zwitterionic surface active agent such as alanine, dodecyldi (aminoethyl) glycine, di(octylaminoethyl) glycine, N-alkyl-N,N-dimethyl ammonium betaine.

Using the surface active agent that includes a fluoroalkyl group enables to enhance the effect of the surface active agent using an extremely small amount of the surface active agent. Examples of desirably used anionic surface active agents that include a fluoroalkyl group are fluoroalkyl carboxylic acids of carbon number 2 to 10 and metal salts of the fluoroalkyl carboxylic acids, perfluorooctane sulfonyl dinatrium gultaminate, 3-(ω-fluoroalkyl (C6 to C11) oxy)-1-alkyl (C3 to C4) natrium sulfonate, 3-(ω-fluoroalkanoyl (C6 to C8)-N-ethylamino)-1-propane natrium sulfonate, fluoroalkyl (C11 to C20) carboxylic acid and metal salts of fluoroalkyl (C11 to C20) carboxylic acid, perfluoroalkyl carboxylic acid (C7 to C13) and metal salts of perfluoroalkyl carboxylic acid (C7 to C13), perfluoroalkyl (C4 to C12) sulfonic acid and metal salts of perfluoroalkyl (C4 to C12) sulfonic acid, perfluorooctane sulfonic acid diethanol amide, N-propyl-N-(2-hydroxyethyl perfluorooctane sulfonic amide, perfluoroalkyl (C6 to C10) sulfonic amide propyl trimethyl ammonium salt, perfluoroalkyl (C6 to C10)-N-ethylsulfonyl glycine salt, monoperfluoroalkyl (C6 to C16) ethyl phosphoric acid ester etc.

Examples of product names are saflon S-111, S-112, S-113 (manufactured by Asahi Glass Company), flolard FC-93, FC-95, FC-98, FC-129 (manufactured by Sumitomo 3M Company), unidine DS-101, DS-102 (manufactured by Daikin Industries Company), megafac F-110, F-120, F-113, F-191, F-812, F-833 (manufactured by Dai Nihon Ink Company), ektop EF-102, 103, 104, 105, 112, 123A, 123B, 306A, 501, 201, 204 (manufactured by Tohkem Products Company), futargent F-100, F-150 (manufactured by Neos Company) etc.

Examples of the cationic surface active agent are aliphatic primary or secondary amino acids that include a fluoroalkyl group, aliphatic quaternary ammonium salts such as perfluoroalkyl (C6 to C10) sulfonic amide propyl trimethyl ammonium salt, benzalkonium salt, benzetonium chloride, pyridium salt, and imidazolium salt. Examples of product names are saflon S-121 (manufactured by Asahi Glass Company), flolard FC-135 (manufactured by Sumitomo 3M Company), unidine DS-202 (manufactured by Daikin Industries Company), megafac F-150, F-824 (manufactured by Dai Nihon Ink Company), ektop EF-132 (manufactured by Tohkem Products Company), and futargent F-300 (manufactured by Neos Company) etc.

The resin particles are added for stabilizing the parent toner particles that are formed in the aqueous solvent. To stabilize the parent toner particles, the resin particles are desirably added such that a surface coverage of the resin particles on the surface of the parent toner particles is in a range of 10 to 90 percent. Examples of the resin particles are methyl polymethacrylate particles of 1 (μm) and 3 (μm), polystyrene particles of 0.5 (μm) and 2 (μm), poly (styrene-acryronitrile) particles of 1 (μm) etc. Examples of product names are PB-200H (manufactured by Kao Company), SGP (manufactured by Soken Company), technopolymer-SB (manufactured by Sekisui Plastics Company), SGP-3G (manufactured by Soken Company), micropearl (manufactured by Sekisui Fine Chemicals Company) etc. Further, inorganic compound dispersing agents such as tricalcium phosphate, calcium carbonate, titanium oxide, colloidal silica, hydroxyapatite etc. can also be used.

Dispersion droplets of the resin particles mentioned earlier can also be stabilized as the dispersing agent that can be used in combination with the inorganic compound dispersing agent by using a polymeric protecting colloid. Examples of the polymeric protecting colloids that can be used are acids such as acrylic acid, methacrylic acid, a-cyanoacrylic acid, a-cyanomethacrylic acid, itaconic acid, crotonic acid, fumaric acid, maleic acid or maleic anhydride, methacrylic monomers that include a hydroxyl group, for example, acrylic acid-β-hydroxyethyl, methacrylic acid-β-hydroxyethyl, acrylic acid-β-hydroxypropyl, methacrylic acid-β-hydroxypropyl, acrylic acid-γ-hydroxypropyl, methacrylic acid-γ-hydroxypropyl, acrylic acid-3-chloro-2-hydroxypropyl, methacrylic acid-3-chloro-2-hydroxypropyl, diethylene glycol monoacrylic acid ester, diethylene glycol monomethacrylic acid ester, glycerin monoacrylic acid ester, glycerin mono methacrylic acid ester, N-methylol acrylic amide, N-methylol methacrylic amide etc., vinyl alcohol or ethers with vinyl alcohol, for example, vinyl methyl ether, vinyl ethyl ether, vinyl propyl ether etc., esters of compounds that include a vinyl alcohol and a carboxyl group, for example, vinyl acetate, vinyl propionate, vinyl butyrate etc., acrylic amide, methacrylic amide, diacetone acrylic amide or methylol compounds of acrylic amide, methacrylic amide, and diacetone acrylic amide, acid chlorides such as chloride acrylate, methacrylic chloride, nitrogen containing compounds, for example, vinyl pyridine, vinyl pyrrolidone, vinyl imidazol, ethyleneimine etc. or heterocyclic homopolymers or copolymers of the nitrogen containing compounds, polyoxyethylenes, for example, polyoxyethylene, polyoxypropylene, polyoxyethylene alkylamine, polyoxypropylene alkyl amine, polyoxyethylene alkyl amide, polyoxypropylene alkyl amide, polyoxyethylene nonylphenyl ether, polyoxyethylene laurylphenyl ether, polyoxyethylene stearylphenyl ester, polyoxyethylene nonylphenyl ester etc., and celluloses, for example, methyl cellulose, hydroxy ethyl cellulose, hydroxy propyl cellulose etc.

The dispersion method is not limited to any specific method, and commonly known methods such as a low speed shearing method, a high speed shearing method, a friction method, a high pressure jet method can be applied. The high speed shearing method is desirable for ensuring a particle diameter of 2 to 20 (μm) for a dispersion element. When using a high speed shearing method dispersing device, although a number of revolutions is not limited to a specific number, the number of revolutions is normally 1000 to 30000 revolutions per minute (rpm), and a number of 5000 to 20000 (rpm) is desirable. Although a dispersion time period is not limited to a specific time period, when using a batch method, the dispersion time period is normally 0.1 to 5 minutes. Normally, the dispersion is carried out at a temperature of 0° to 150° C. (under pressure) and a temperature of 40° to 98° C. is desirable.

Next, along with preparation of an emulsified liquid, the amines (B) are simultaneously added and the emulsified liquid is caused to react with the polyester prepolymer (A) that includes an isocyanate group.

During the reaction mentioned earlier, the molecular chain is subjected to any one of the crosslinking reaction or the elongation reaction or both. Although a reaction time period is selected based on a reactivity of an isocyanate group structure included in the polyester prepolymer (A) with the amines (B), the reaction time period is normally 10 minutes to 40 hours, and a reaction time period of 2 to 24 hours is desirable. A reaction temperature is normally 0° C. to 150° C. and a reaction temperature of 40° C. to 98° C. is desirable. A commonly known catalyst can be used if required. To be specific, a catalyst such as dibutyltin laurate or dioctyltin laurate can be used.

After completion of the reaction, the organic solvent is removed from the emulsified dispersion element (reaction product) and the reaction product is cleaned and dried to get the parent toner particles.

For removing the organic solvent, the temperature is gradually increased while stirring a laminar flow of the entire reaction product. After strongly stirring the reaction product at a fixed temperature range, the organic solvent is removed and the spindle shaped parent toner particles can be formed. Further, if a chemical such as a calcium phosphate salt which is soluble in acids and alkalies is used as a dispersion stabilizer, the calcium phosphate salt is dissolved using an acid such as hydrochloric acid and the resulting solution is washed with water to remove the calcium phosphate salt from the toner particles. Further, the calcium phosphate salt can also be removed using an operation such as enzymatic breakdown.

The electric charge controller is added to the parent toner particles that are obtained using the method mentioned earlier, and the inorganic particles such as silica particles and titanium oxide particles are externally added to get the toner.

Addition of the electric charge controller and external addition of the inorganic particles is carried out by a commonly known method that uses a mixer.

Due to this, the toner having a small particle diameter and a sharp particle diameter distribution can be easily obtained. Further, due to strong stirring during the process to remove the organic solvent, a shape of the toner particles can be controlled to a shape between a spherical shape and a rugby ball shape. Further, a surface morphology of the toner particles can also be controlled to between smooth and corrugated.

As explained above, according to the present embodiment, the copier 500 being the image forming apparatus includes the screw 220 as the rotator that rotates around the shaft portion 221 being the rotating shaft, and also the bearing element 223 that supports the shaft portion 221 to the housing 40a of the developing device 40. Used as the bearing element 223 is the sliding element as explained in Example 1 or 2 formed of the composite material containing the self-lubricating thermoplastic olefin resin as the base material. Specifically, the sliding element formed of the composite material has at least a ratio of numerical values of Rockwell hardness (based on R scale of JIS K7202)/bending elastic modulus (based on JIS K7171) in a range from 25 to 45 and provides the sliding surface with a frictional coefficient lower than that of the sliding element formed of the base material. The bearing element 223 formed of the sliding element that is configured in the above manner allows minimization of toner leakage, carrier leakage, and abnormal noise. Because the abnormal noise can be minimized, the longer operating life of the developing device 40 and the copier 500 can be achieved.

As explained in Example 1, by using the sliding element formed of the composite material in which the base material constitutes 79% by volume being not less than 75% by volume, it is possible to further reduce the coefficient $\mu$ of dynamic friction and also reduce the amount of wear, which allows further minimization of abnormal noise.

The copier 500 forms images using toner particles, and by using toner particles of which an average circularity is in a range from 0.930 to 0.970, high quality of formed images can be achieved and abnormal noise can be prevented.

Moreover, by using crystalline polyester-containing toner particles, it is possible to balance achievement of low temperature fixability and prevention of abnormal noise.

Toner particles with a volume-average particle size of from 3 micrometers to 6 micrometers and a ratio (Dv/Dp) of the weight-average particle size (Dv) to the number-average particle size (Dp) in a range from 1.00 to 1.40 are used. This allows prevention of the abnormal noise, the toner leakage, and the carrier leakage.

The sliding element used for the bearing element 223 is manufactured by injection molding, and is used for the developing device 40 which is a portion in contact with the toner particles and carrier particles being fine particles. The sliding element can also be manufactured by cutting work or using a resin mold or the like, however, when the sliding element is formed by injection molding, it is possible to improve protection against scrape-through of fine particles on the sliding surface of the sliding element and to reliably prevent the toner leakage and the carrier leakage.

By using the bearing formed of the present sliding element as the bearing element 223 of the screw 220 which is the rotator provided in the developing device 40, not only the abnormal noise but also the toner leakage and the carrier leakage can be prevented.

The copier 500 uses the developing device 40 as the developing unit that develops an electrostatic latent image on the surface of the photosensitive element 101 being a latent-image carrier. Specifically, the developing device 40 includes the bearing element 223 that is formed of the present sliding element and supports the rotating shaft of the developer conveying screw to the housing 40a of the device. The developing device 40 can prevent the toner leakage and the carrier leakage, which enables the copier 500 to prevent inside the device from being contaminated caused by the toner leakage or by the carrier leakage through any bearing of the conveying screws in the developing device 40. Moreover, the developing device 40 can prevent occurrence of abnormal noise, which allows a longer operating life of the device.

In the present invention, the sliding element formed of the composite material that contains the self-lubricating thermoplastic olefin resin as the base material is used as the bearing element. Specifically, the sliding element formed of the composite material has at least a ratio of numerical values of Rockwell hardness (based on R scale of JIS K7202)/bending elastic modulus (based on JIS K7171) in a range from 25 to 45 and provides the sliding surface with a frictional coefficient lower than that of the sliding element formed of the base material. As a result of experiments such as Experiment 1 and Experiment 2 carried out by the inventors, it is confirmed that by using the sliding element formed of the composite material as the bearing element, occurrence of abnormal noise can be minimized as compared with the device with the conventional bearing element.

According to one aspect of the present invention, abnormal noise can be minimized, and this allows achievement of a longer operating life of the device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A developing device that supplies toner to and develops an electrostatic image formed on a latent-image carrier, the developing device comprising:

a housing;

a rotating shaft;

a rotator that rotates with the rotating shaft; and a bearing element that supports the rotating shaft to the housing, the bearing element formed of a composite material, the composite material containing thermoplastic olefin resin as a base material and a lubricity enhancing material, the composite material having at least a ratio of numerical values of Rockwell hardness (based on R scale of JIS K7202)/bending elastic modulus in GPa (based on JIS K7171) in a range from 25 to 45, and the composite material having a frictional coefficient that is lower than that of the base material.

2. The developing device according to claim 1, wherein the base material constitutes 75% by volume or more of the composite material.

3. The developing device according to claim 1, wherein the developing device stores toner particles having an average circularity in a range from 0.930 to 0.970 defined as follows:

Circularity=$L0/L$

L0: circumferential length of a circle having an area equivalent to a projected area of a toner particle L: circumferential length of a projected image of the toner particle.

4. The developing device according to claim 1, wherein the developing device stores toner particles containing crystalline polyester.

5. The developing device according to claim 1, wherein the developing device stores toner particles having a volume-average particle size of 3 micrometers to 6 micrometers, and have a ratio (Dv/Dp) of a weight-average particle size (Dv) to a number-average particle size (Dp) in a range from 1.00 to 1.40.

6. The developing device according to claim 1, wherein the bearing element is injection molded, and the bearing element is used in a portion that comes in contact with fine particles.

7. An image forming apparatus that forms an image on a recording medium, the image forming apparatus comprising:
a housing;
a rotating shaft;
a rotator that rotates with the rotating shaft; and
a bearing element that supports the rotating shaft to the housing,
the bearing element formed of a composite material, the composite material containing thermoplastic olefin resin as a base material and a lubricity enhancing material, the composite material having at least a ratio of numerical values of Rockwell hardness (based on R scale of JIS K7202)/bending elastic modulus in GPa (based on JIS K7171) in a range from 25 to 45, and the composite material having a frictional coefficient that is lower than that of the base material.

8. The image forming apparatus according to claim 7, wherein the base material constitutes 75% by volume or more of the composite material.

9. The image forming apparatus according to claim 7, wherein the image forming apparatus stores toner particles having an average circularity in a range from 0.930 to 0.970 defined as follows:

Circularity=$L0/L$

L0: circumferential length of a circle having an area equivalent to a projected area of a toner particle L: circumferential length of a projected image of the toner particle.

10. The image forming apparatus according to claim 7, wherein the image forming apparatus stores toner particles containing crystalline polyester.

11. The image forming apparatus according to claim 7, wherein the image forming apparatus stores toner particles having a volume-average particle size of 3 micrometers to 6 micrometers, and have a ratio (Dv/Dp) of a weight-average particle size (Dv) to a number-average particle size (Dp) in a range from 1.00 to 1.40.

12. The image forming apparatus according to claim 7, wherein the bearing element injection molded, and the bearing element is used in a portion that comes in contact with fine particles.

13. The image forming apparatus according to claim 7, further comprising:
a latent-image carrier;
a latent-image forming unit that forms an electrostatic latent image on a surface of the latent-image carrier; and
a developing device that supplies toner to and develops the electrostatic latent image into a toner image, the developing device including
a housing;
a rotating shaft;
a rotator that rotates with the rotating shaft; and
a bearing element that supports the rotating shaft to the housing,
the bearing element formed of a composite material, the composite material containing thermoplastic olefin resin as a base material and a lubricity enhancing material, the composite material having at least a ratio of numerical values of Rockwell hardness (based on R scale of JIS K7202)/bending elastic modulus in GPa (based on JIS K7171) in a range from 25 to 45, and the composite material having a frictional coefficient that is lower than that of the base material.

14. The developing device according to claim 1, in which the rotator is a screw.

15. The image forming apparatus according to claim 7, in which the rotator is a screw.

* * * * *